(12) United States Patent
Corio et al.

(10) Patent No.: US 9,281,778 B2
(45) Date of Patent: Mar. 8, 2016

(54) MOUNTING BRACKET ASSEMBLIES AND METHODS

(71) Applicants: Ronald P. Corio, Albuquerque, NM (US); John N. Williamson, Albuquerque, NM (US); Kaleb W. McLane, Albuquerque, NM (US)

(72) Inventors: Ronald P. Corio, Albuquerque, NM (US); John N. Williamson, Albuquerque, NM (US); Kaleb W. McLane, Albuquerque, NM (US)

(73) Assignee: Array Technologies, Inc., Albuquerque, NM (US)

( * ) Notice: Subject to any disclaimer, the term of this patent is extended or adjusted under 35 U.S.C. 154(b) by 247 days.

(21) Appl. No.: 14/044,704

(22) Filed: Oct. 2, 2013

(65) Prior Publication Data

US 2015/0092383 A1    Apr. 2, 2015

(51) Int. Cl.
| | | |
|---|---|---|
| *E04D 13/18* | (2014.01) | |
| *H02S 20/30* | (2014.01) | |
| *F24J 2/52* | (2006.01) | |
| *H02S 20/10* | (2014.01) | |
| *F24J 2/54* | (2006.01) | |

(52) U.S. Cl.
CPC ............... *H02S 20/30* (2014.12); *F24J 2/5209* (2013.01); *F24J 2/5232* (2013.01); *F24J 2/5256* (2013.01); *F24J 2/5258* (2013.01); *F24J 2/541* (2013.01); *H02S 20/10* (2014.12)

(58) Field of Classification Search
CPC ........ H02S 20/10; H02S 20/30; F24J 2/5258; F24J 2/5209; F24J 2002/0038; F24J 2002/0046; F16B 2/02; F16B 5/06; F16B 5/0635

USPC ......... 248/214, 228.3, 229.12, 230.4, 231.41, 248/231.51, 250; 52/173.3; 211/90.01, 182, 211/183, 184
See application file for complete search history.

(56) References Cited

U.S. PATENT DOCUMENTS 704,957 A * 7/1902 Croom .......................... 248/214
2,675,201 A * 4/1954 Friel ........................... 248/228.3
(Continued)

FOREIGN PATENT DOCUMENTS

DE    102011106083 A1 * 12/2012

OTHER PUBLICATIONS

International Search Report and Written Opinion mailed Jan. 7, 2015 in International Application No. PCT/US2014/058041.

*Primary Examiner* — Gwendolyn Baxter
(74) *Attorney, Agent, or Firm* — Eric L. Lane; Green Patent Law

(57) ABSTRACT

A mounting bracket assembly comprises a flexible body including at least one top member and a flexible angled bottom member connected to the top member. The flexible body defines a beam insertion aperture between the top member and the bottom member. The mounting bracket assembly further comprises at least one clamp attached to the top member. The mounting bracket assembly may further comprise a threaded rod running through the at least one top member and a clamping nut securing the threaded rod to the top member such that rotating the clamping nut compresses the top member and grounds an electricity generating device such as a photovoltaic module. The mounting bracket assembly may further comprise an integral grounding device disposed adjacent the top member to electrically ground the electricity generating device.

18 Claims, 20 Drawing Sheets

(56) References Cited

U.S. PATENT DOCUMENTS

| | | | |
|---|---|---|---|
| 3,698,691 A * | 10/1972 | Brown | 256/11 |
| 4,019,705 A | 4/1977 | Habuda, Sr. et al. | |
| 4,065,218 A | 12/1977 | Biggane | |
| 5,863,020 A * | 1/1999 | Olson et al. | 248/228.3 |
| 7,472,876 B2 * | 1/2009 | Jones | 248/242 |
| 8,413,944 B2 | 4/2013 | Harberts et al. | |
| 2010/0089389 A1 | 4/2010 | Seery et al. | |
| 2011/0253190 A1 | 10/2011 | Farnham | |
| 2013/0192150 A1 | 8/2013 | DuPont et al. | |

* cited by examiner

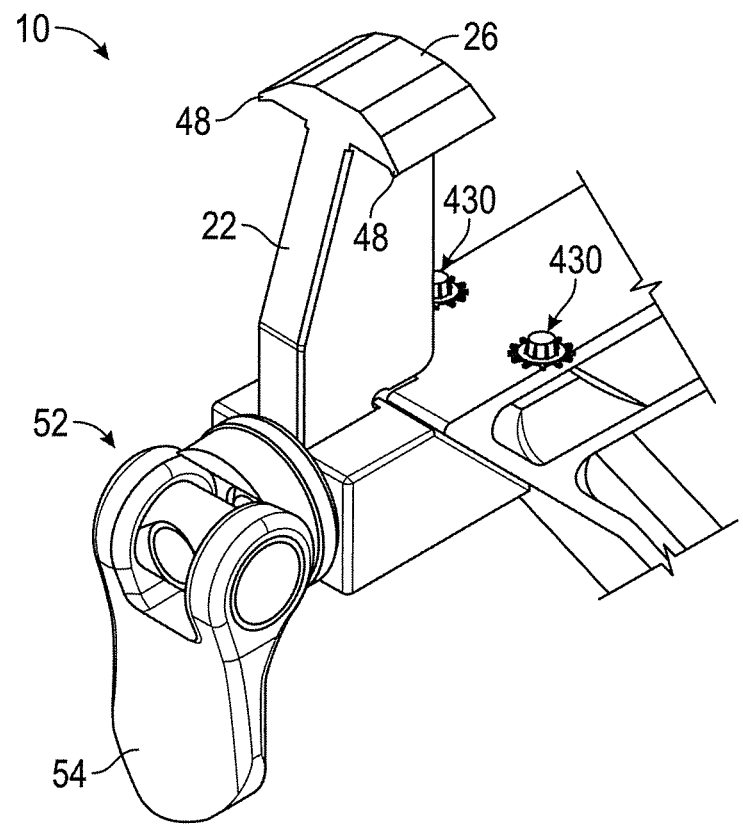
FIG. 22
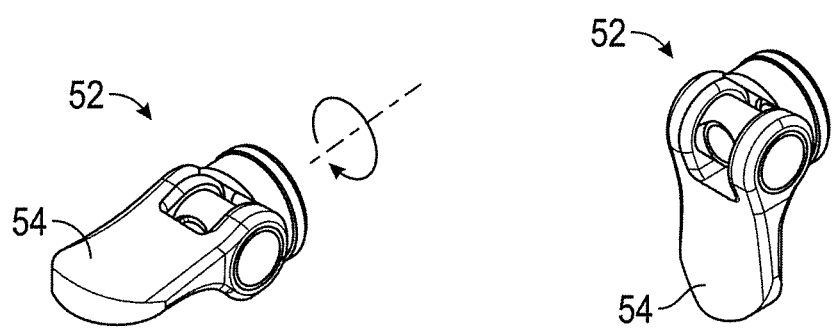
FIG. 23A  FIG. 23B

MOUNTING BRACKET ASSEMBLIES AND METHODS

FIELD

The present disclosure relates to mounting bracket assemblies and related systems and methods.

BACKGROUND

Most photovoltaic ("PV") modules are quite heavy because they use glass to encase the PV cells. A solar mounting system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant horsepower. Therefore, mounting and tracking systems for PV modules typically are relatively large, complex assemblies comprising large, heavy components.

These components can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting system components that minimize the overall use of material to be lighter weight and reduce costs. In addition, there is a need for PV mounting system components that can reduce the time necessary for installation and for quality control during construction in the field.

Furthermore, today a number of PV systems use modules that have custom frames or unframed modules. Depending on whether the PV modules use standard frames or these other variations, different components and designs are needed for the mounting and tracking systems. Thus, there is a need for a PV mounting system having a base design capable of mounting PV modules using standard frames, custom frames, and even unframed modules.

Accordingly, there is a need for PV mounting system components that efficiently use structural material only where it is needed. There is also a need for a PV mounting system with components that provide easier and quicker installation and quality control capability. Finally, there is a need for a PV mounting system capable of mounting modules using standard frames, custom frames, and even unframed modules.

SUMMARY

Embodiments of the present disclosure alleviate to a great extent the disadvantages of known mounting systems and solar trackers and associated components by providing a mounting bracket assembly comprising a flexible body having material in the form of the stresses on the system and a configuration that facilitates secure connection between a PV module and a rounded or other hollow shaped torsion beam with a single bolt. An integral grounding device configured to secure and electrically ground a metal framed PV module may also be provided on the mounting bracket assembly.

Exemplary embodiments of a mounting bracket assembly comprise a flexible body including at least one top member and a flexible angled bottom member connected to the top member. The flexible body defines a beam insertion aperture between the top member and the bottom member. At least one clamp is attached to the top member. In exemplary embodiments, an integral grounding device is disposed adjacent the top member and is configured to electrically ground an electricity generating device. In exemplary embodiments, the electricity generating device is a photovoltaic module. The mounting bracket assembly may further comprise a threaded rod or cap screw and a clamping nut securing the threaded rod to the top member.

In exemplary embodiments, the threaded rod runs through the at least one top member and the at least one clamp and secures the clamp to the top member. The integral grounding device may be a grounding block disposed in a middle portion of the top member. In such embodiments, rotating the clamping nut compresses the top member, thereby moving the grounding block such that it grounds the electricity generating device. In exemplary embodiments, the integral grounding device may include a locating pin located at or near an end portion of the top member. The clamping nut may be a breakaway component that breaks off breaks off when the photovoltaic module is secured by the at least one clamp at a pre-determined level of torque. In exemplary embodiments, the clamping nut breaks off at a pre-determined torque, at the condition when the grounding block grounds the electricity generating device, the electricity generating device is securely clamped, and the mounting bracket assembly is securely clamped around the torsion beam.

In exemplary embodiments, the at least one clamp has an angled mating surface corresponding to an angled end of the top member such that the clamp mates with the top member at a defined mating angle. Varying the defined mating angle of the at least one clamp in relation to the top member changes a gripping force of the mounting bracket assembly on a beam running through the beam insertion aperture and/or varying the defined mating angle of the at least one clamp in relation to the top member changes a clamping force of the mounting bracket assembly on an electricity generating device.

Exemplary embodiments of a mounting bracket assembly comprise a flexible body including at least one top member and a flexible angled bottom member connected to the top member. The flexible body defines a beam insertion aperture between the top member and the bottom member. At least one clamp is attached to the top member. In exemplary embodiments, an integral grounding device is disposed adjacent the top member and is configured to electrically ground an electricity generating device. The mounting bracket assembly may further comprise a threaded rod running through the at least one top member and the clamp securing the clamp to the top member. In exemplary embodiments, a clamping nut secures the threaded rod to the top member.

In exemplary embodiments, the clamp has an angled mating surface corresponding to an angled end of the top member such that the clamp mates with the top member at a defined mating angle. Rotating the clamping nut may secure the mounting bracket assembly to a torsion beam of any shape, including with a beam having at least a partially rounded surface. In exemplary embodiments, varying the defined mating angle of the at least one clamp in relation to the top member changes a gripping force of the mounting bracket assembly on a beam running through the beam insertion aperture and/or changes a clamping force of the mounting bracket assembly on an electricity generating device.

Exemplary embodiments include a mounting assembly comprising at least one support column, a torsion beam connected to the support column, a mounting rack attached to the torsion beam, and a mounting bracket assembly mounting the mounting rack to the torsion beam. The mounting bracket assembly includes a flexible body including at least one top member and a flexible angled bottom member connected to the top member, and at least one clamp attached to the top member. The flexible body defines a beam insertion aperture between the top member and the bottom member, and the torsion beam runs through the beam insertion aperture.

In exemplary embodiments, the mounting bracket assembly may further include an integral grounding device disposed adjacent the top member. The integral grounding device is configured to secure and electrically ground a photovoltaic module. The mounting bracket assembly may further include a threaded rod running through the at least one top member and the at least one clamp and securing the clamp to the top member and a clamping nut securing the threaded rod to the top member. In exemplary embodiments, rotating the clamping nut secures the mounting bracket assembly to the torsion beam. The torsion beam may be any shape and may include an at least partially rounded surface.

In exemplary embodiments, the integral grounding device includes a locating pin located at or near an end portion of the top member. In exemplary embodiments, the integral grounding device is a grounding block disposed in a middle portion of the top member such that rotating the clamping nut compresses the top member, thereby moving the grounding block such that it grounds the electricity generating device.

Exemplary embodiments may include methods of securing and grounding an electricity generating device comprising providing a mounting bracket assembly including a flexible body having at least one top member, a flexible angled bottom member connected to the top member, and attaching at least one clamp to the top member. The flexible body defines a beam insertion aperture between the top member and the bottom member, and a torsion beam may be inserted therethrough.

Exemplary methods further comprise configuring an integral grounding device to electrically ground an electricity generating device and connect the electricity generating device to a torsion beam and disposing the integral grounding device adjacent the top member. The integral grounding device may be a locating pin located at or near an end portion of the top member. In exemplary embodiments, the integral grounding device is a grounding block disposed in a middle portion of the top member such that rotating the clamping nut compresses the top member, thereby moving the grounding block such that it grounds the electricity generating device.

A threaded rod may be disposed such that it runs through the top member and the clamp. In exemplary embodiments, the rod runs through two clamps, two top members, and the grounding block, holding all these components together. Exemplary methods may include the steps of securing the threaded rod to the top member via a clamping nut and rotating the clamping nut to compress the top member, thereby moving the integral grounding device such that it grounds the electricity producing device. Exemplary methods may also include the steps of varying a defined mating angle of the clamp in relation to the top member to change a gripping force of the mounting bracket assembly on a beam running through the beam insertion aperture and/or change a clamping force of the mounting bracket assembly on an electricity producing device such as a photovoltaic module.

Exemplary embodiments facilitate separation of downward force exerted on a PV module and gripping force exerted on the torsion beam. The clamps are tightened to a physical stop such that remaining force in the clamp screw to be directed into the gripping force on the tube. In exemplary embodiments, the clamps include a spring design feature that allows the downward clamping force exerted on the PV module to remain constant even if there is thickness variance of the module frame or during temperature fluctuations.

Accordingly, it is seen that mounting bracket assemblies, mounting assemblies, and associated methods are provided. The disclosed assemblies and methods make efficient use of structural material by using a flexible structural piece with a grounding block configured to secure and electrically ground an electricity generating device. Disclosed assemblies and methods provide easier quality control capability through a single clamping nut to control securing and grounding and a breakaway fastener that indicates when the assembly is applying the proper level of torque load. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 22 is detail view of an exemplary embodiment of a clamp of a mounting bracket assembly in accordance with the present disclosure;

FIG. 23A is a perspective view of an exemplary embodiment of a cam-over device in accordance with the present disclosure; and FIG. 23B is a perspective view of an exemplary embodiment of a cam-over device in accordance with the present disclosure.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure relate to mounting bracket assemblies, mounting assembly components, systems and associated methods. Exemplary embodiments make efficient use of structural material by using a flexible structural piece with an integral grounding device configured to secure and electrically ground an electricity generating device. An electricity generating device could be any kind of device that directly or indirectly converts solar radiation to electricity or collects, reflects, or concentrates solar radiation, including photovoltaic cells or modules, solar thermal devices, solar energy collectors, or components thereof. Advantageously, embodiments of the disclosure provide integral grounding that bonds a PV module frame to the clamps of the mounting bracket assembly and to the torsion beam with a single bolt. Disclosed assemblies and methods also provide easier quality control capabilities. More particularly, rotating a single clamping nut secures an electricity generating device such as a photovoltaic ("PV") module to a rounded torsion beam and grounds the electricity generating device, and a breakaway fastener indicates when the assembly is applying the proper level of torque load. These and additional advantages are explained in more detail below.

Figure 1:
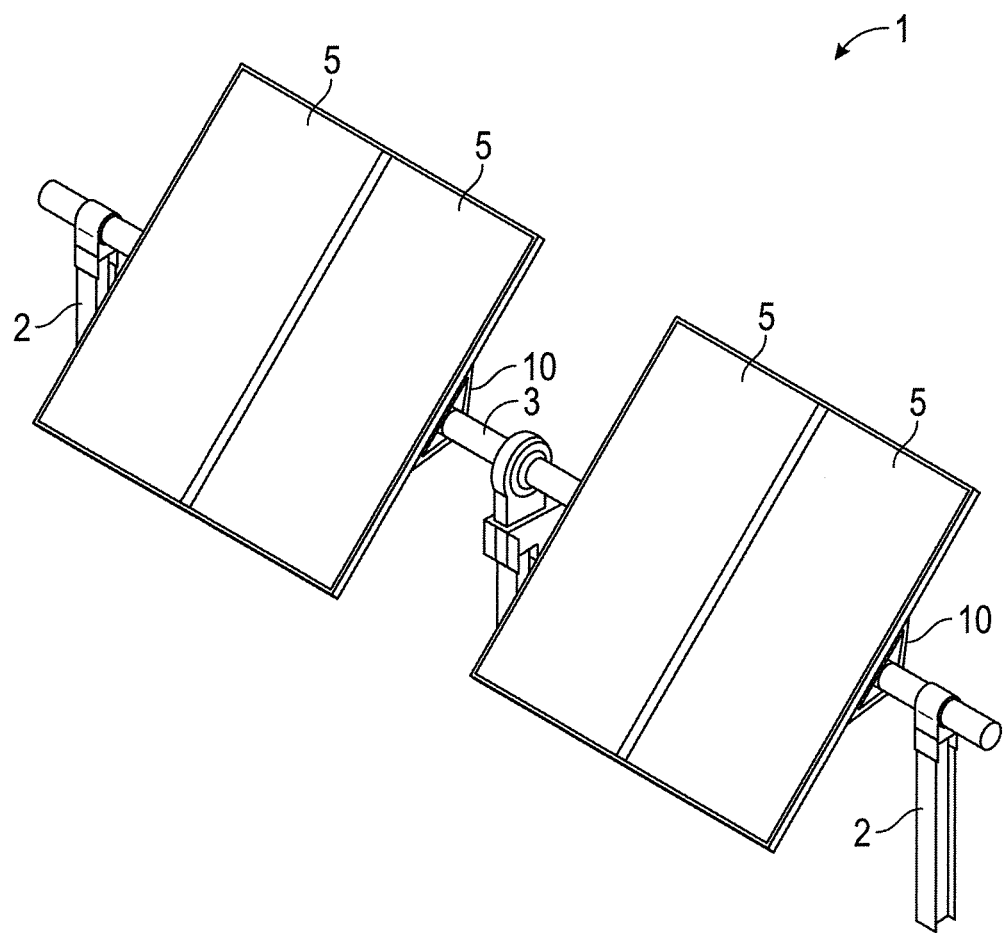
FIG. 1 is a front perspective view of an exemplary embodiment of a mounting system and mounting bracket assembly in accordance with the present disclosure.
Figure 2:
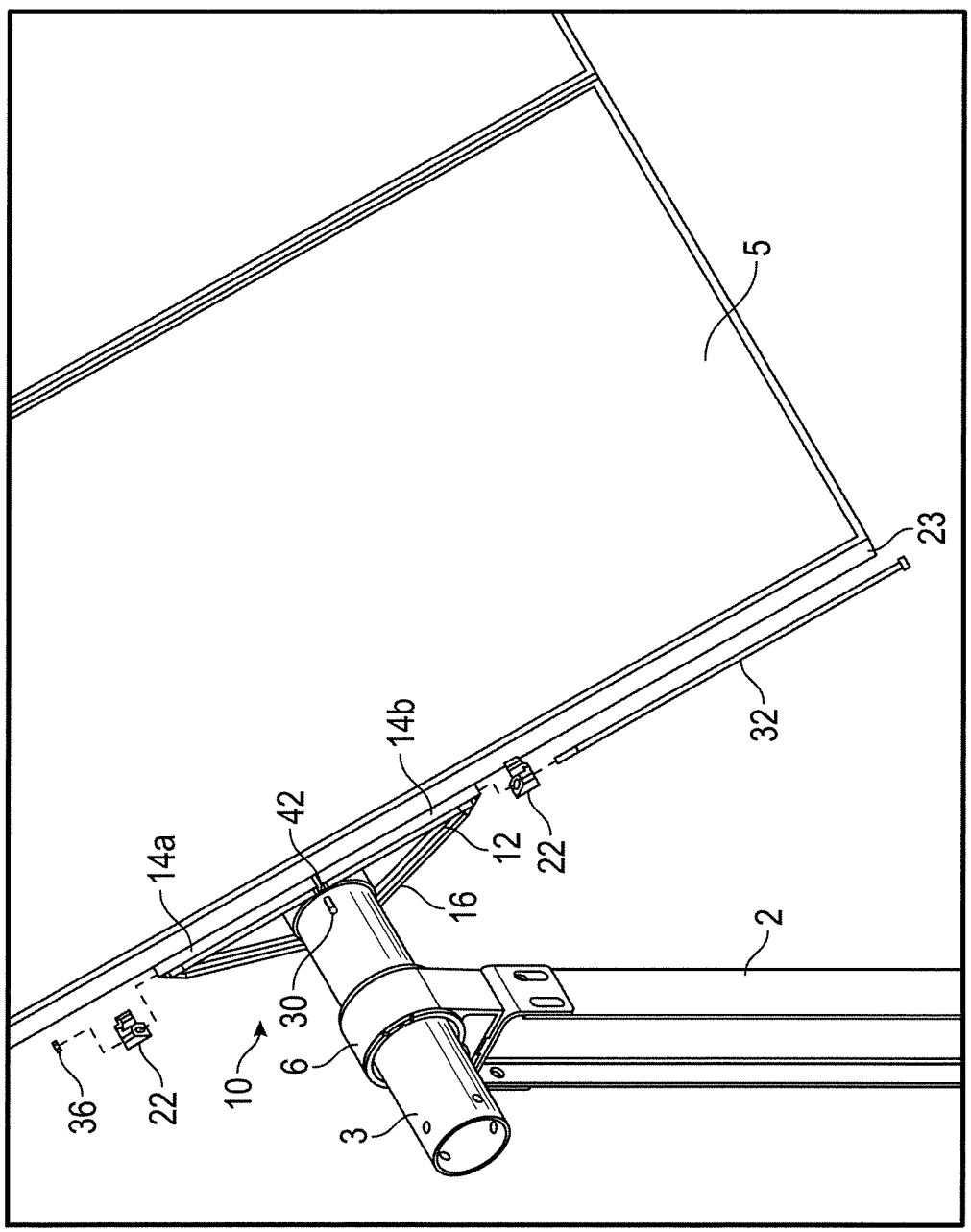
FIG. 2 is a front perspective view of an exemplary embodiment of a mounting system and mounting bracket assembly in accordance with the present disclosure.
Figure 3:
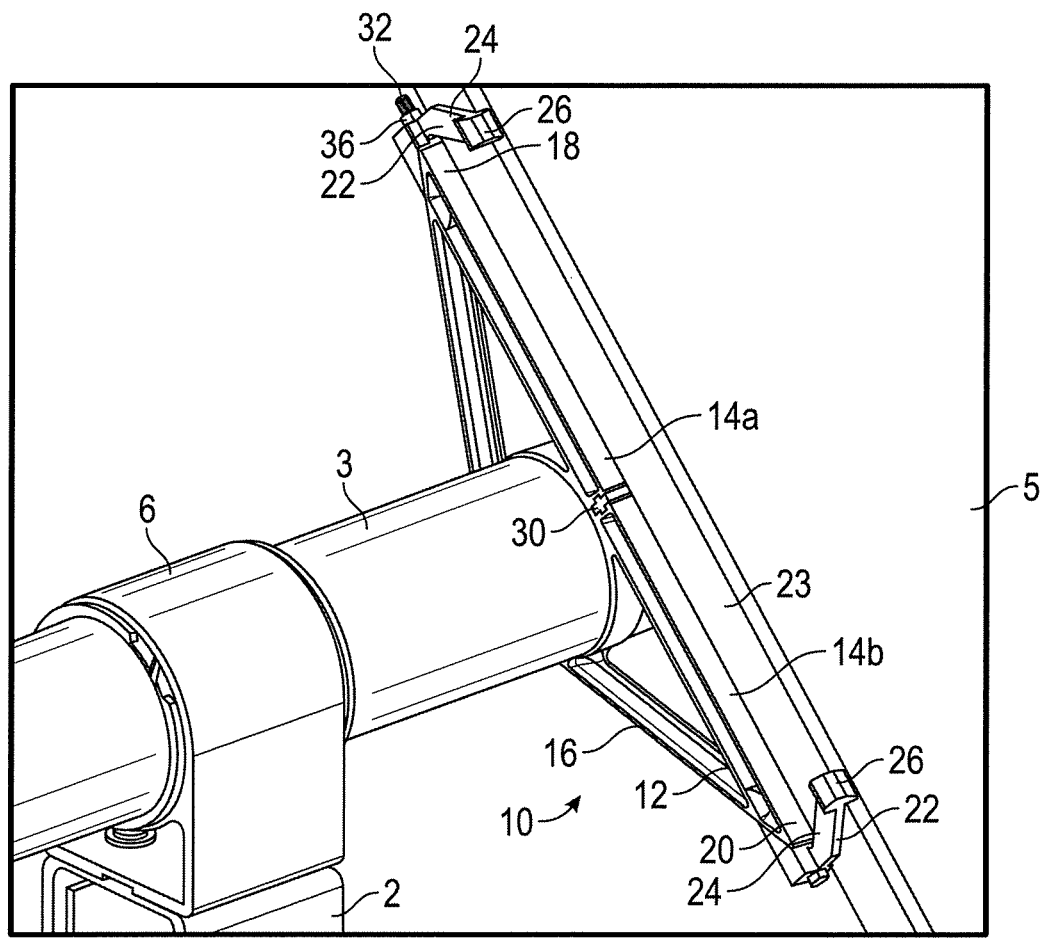
FIG. 3 is a detail perspective view of an exemplary embodiment of a mounting system and mounting bracket assembly in accordance with the present disclosure.
Figure 4A:
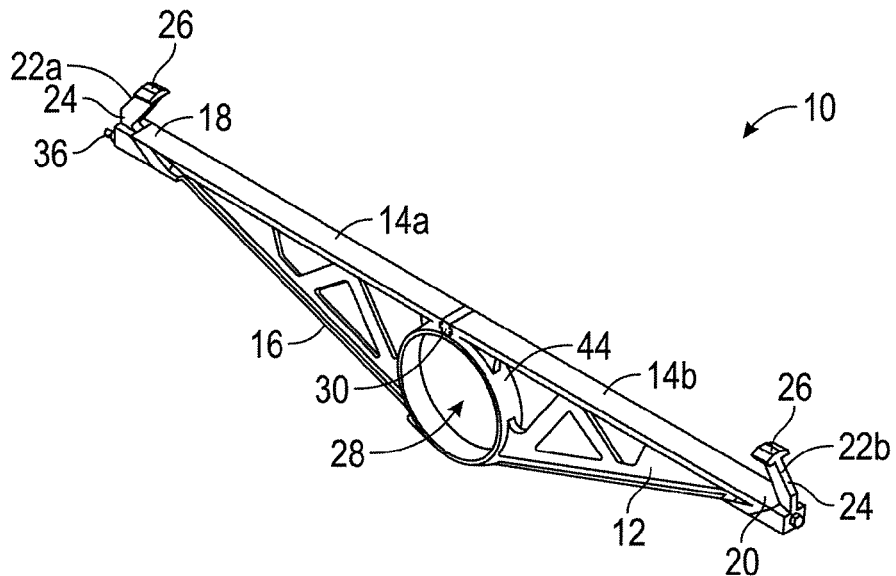
FIG. 4A is a perspective view of an exemplary embodiment of a mounting bracket assembly in accordance with the present disclosure.
Figure 4B:
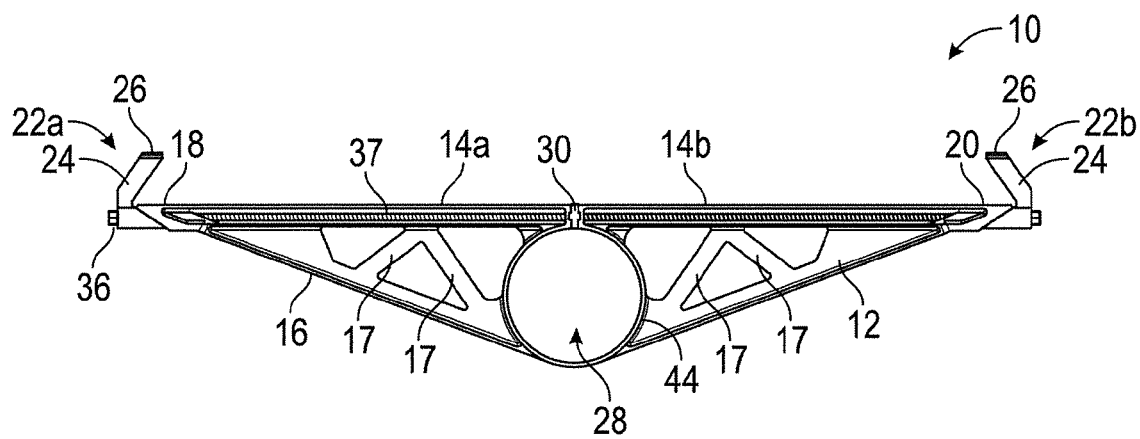
FIG. 4B is a front view of the mounting bracket assembly of FIG. 4A.
Figure 4C:
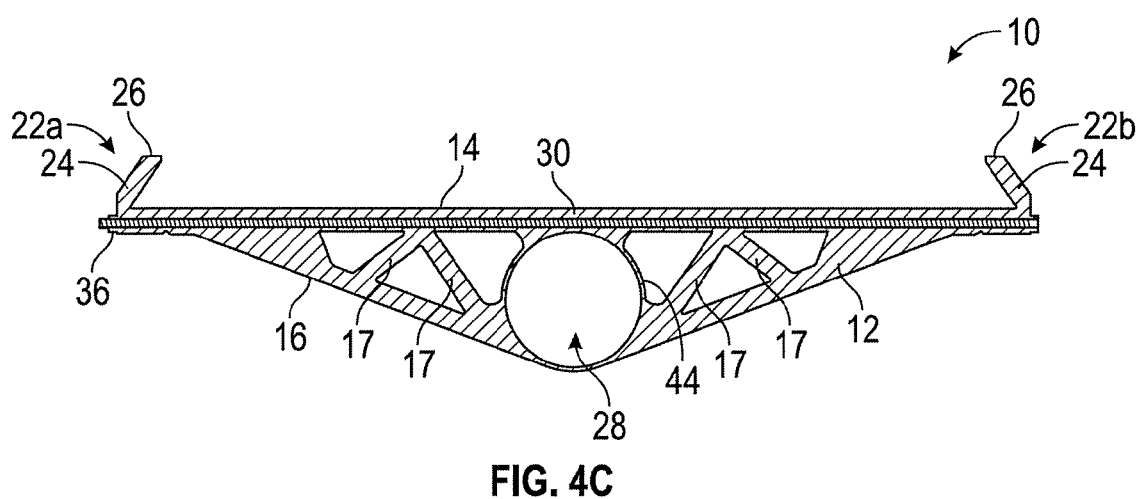
FIG. 4C is a front cross-sectional view of the mounting bracket assembly of FIG. 4A.
Figure 5A:
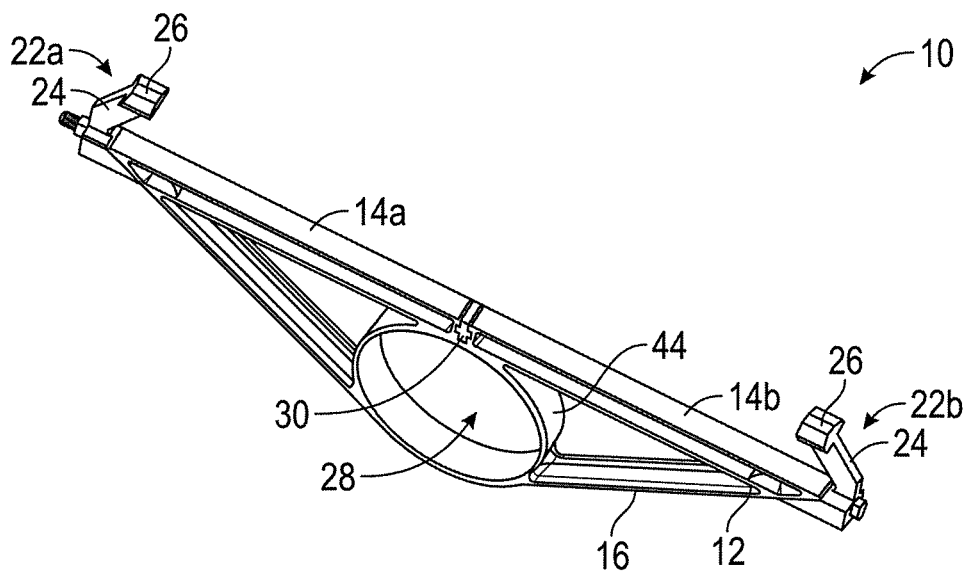
FIG. 5A is a perspective view of an exemplary embodiment of a mounting bracket assembly in accordance with the present disclosure.
Figure 5B:
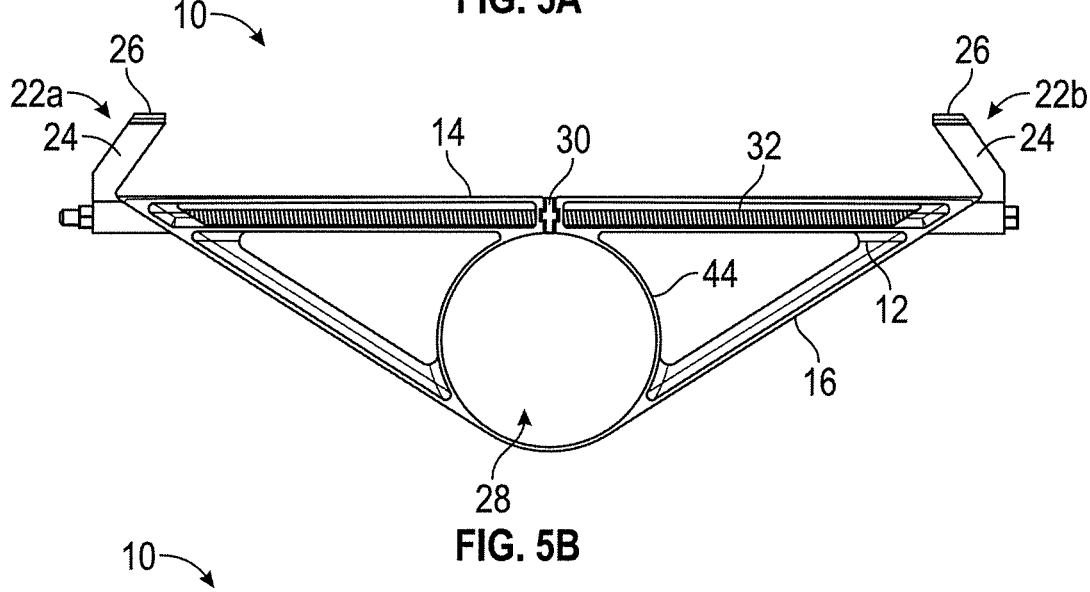
FIG. 5B is front view of the mounting bracket assembly of FIG. 5A.
Figure 5C:
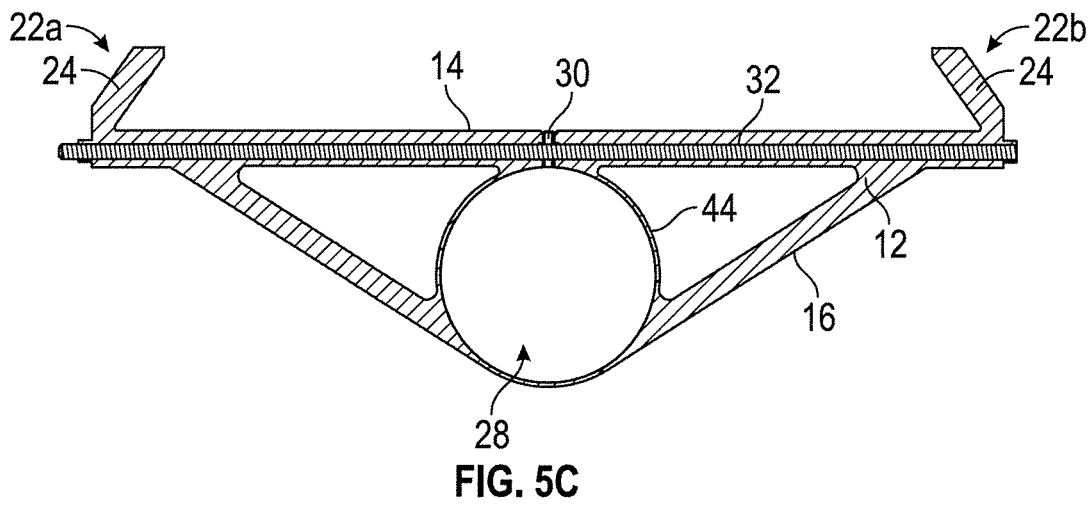
FIG. 5C is a front cross-sectional view of the mounting bracket assembly of FIG. 5A.
Figure 15:
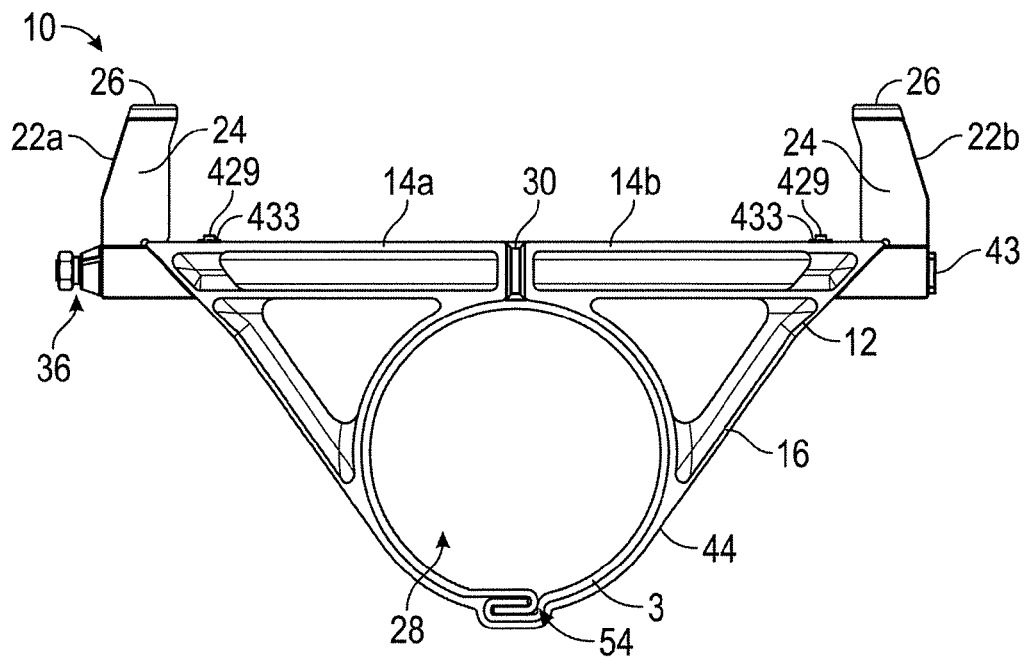
FIG. 15 is a side view of an exemplary embodiment of a mounting bracket assembly in accordance with the present disclosure.

With reference to FIGS. 2-5C, exemplary embodiments of a mounting bracket assembly will be described. Disclosed mounting bracket assemblies and methods can be used in a number of different contexts. One such application is in a solar mounting and/or tracking system. FIG. 1 shows an exemplary solar mounting system 1 including at least one support column 2, a torsion beam 3 connected to the support column 2 by a bearing 6, a mounting rack (not shown) attached to the torsion beam 3, and at least one photovoltaic module 5 mounted to the mounting system. An exemplary mounting bracket assembly 10 may be used to mount the mounting rack 4 to the torsion beam 3. The torsion beam 3 may be any shape, including but not limited to, round, square, hexagonal, or any hybrid shape such as rounded with flats on one or more sides. One of the advantages of the disclosed embodiments is the ability of the mounting bracket to securely connect to a round or rounded tube using a single bolt, the threaded rod discussed herein. In exemplary embodiments, the torsion beam can be a tube having a lock seam feature 54, as illustrated in FIG. 15. As discussed in more detail herein, the mounting bracket assembly defines a beam insertion aperture 28 such that the torsion beam 3 may be disposed therein and run through the aperture.

An exemplary mounting bracket assembly 10 comprises a body 12 or structural piece that may be made in whole or in part of a flexible or semi-flexible material. The flexible body 12 includes at least one top member 14 and an angled bottom member 16 connected to the top member 14 at opposite ends 18, 20 thereof. The top member 14 and/or bottom member 16 may be made of a flexible or semi-flexible material. The angled bottom member 16 may be fixedly attached to the top member 14 or the body 12 may be a unitary structure made by machining, extrusion, casting, molding, of cast aluminum, extruded aluminum, injection molded plastic, or could be made of steel, fiberglass, composite, or any other strong flexible or semi-flexible material. The angle of the bottom member 16 may vary as seen in the embodiments of FIGS. 4A-4C and 5A-5C. A network of strengthening members 17 may be provided between the top member 14 and the angled bottom member 16.

The body 12 includes a ring 44 that defines a beam insertion aperture 28 between the top member 14 and the bottom member 16. The beam insertion aperture may be of any size or shape depending on the size and shape of the torsion beam 3 being inserted therethrough, including but not limited to, round, square, hexagonal, or any hybrid shape such as rounded with flats on one or more sides. The size of the ring 44 and the beam insertion aperture 28 may vary depending on the application, as seen in the embodiments of FIGS. 4A-4C and 5A-5C. The mounting bracket assembly 10 is advantageously designed so it has structural material only where necessary and is in the shape and form of the stresses on the assembly.

Figure 21A:
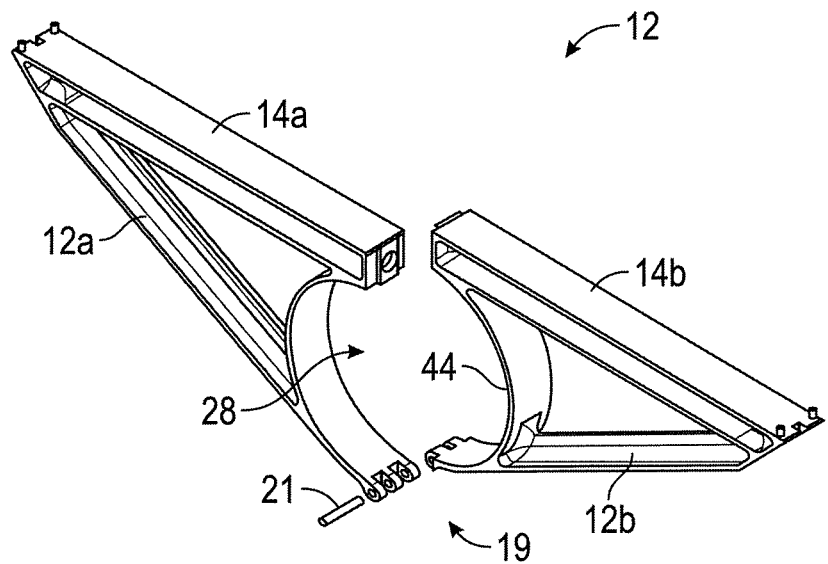
FIG. 21A is a perspective view an exemplary embodiment of a mounting bracket body in accordance with the present disclosure.
Figure 21B:
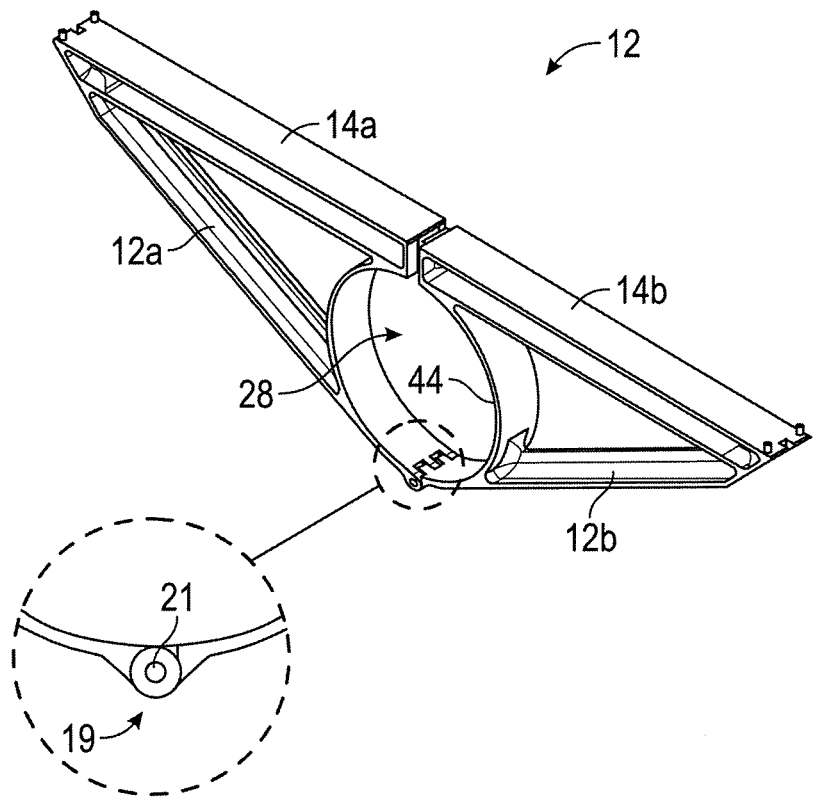
FIG. 21B is a perspective view an exemplary embodiment of a mounting bracket body in accordance with the present disclosure.

In exemplary embodiments, the body 12 of the mounting bracket assembly 10 could have a two-piece construction. FIGS. 20, 20A-B, and 21A-B illustrate embodiments in which body 12 comprises two attachable body pieces 12a and 12b. This advantageously facilitates attachment of the mounting bracket assembly 10 to the torsion beam 3. The body pieces could be joined by a slidable locking mechanism 13 comprising a mating flange 15 and groove 17, as seen FIGS. 20A and 20B. Alternatively, as shown in FIGS. 21A and 21B, a hinged connection 19 including a hinge pin 21 could be provided.

Figure 6:
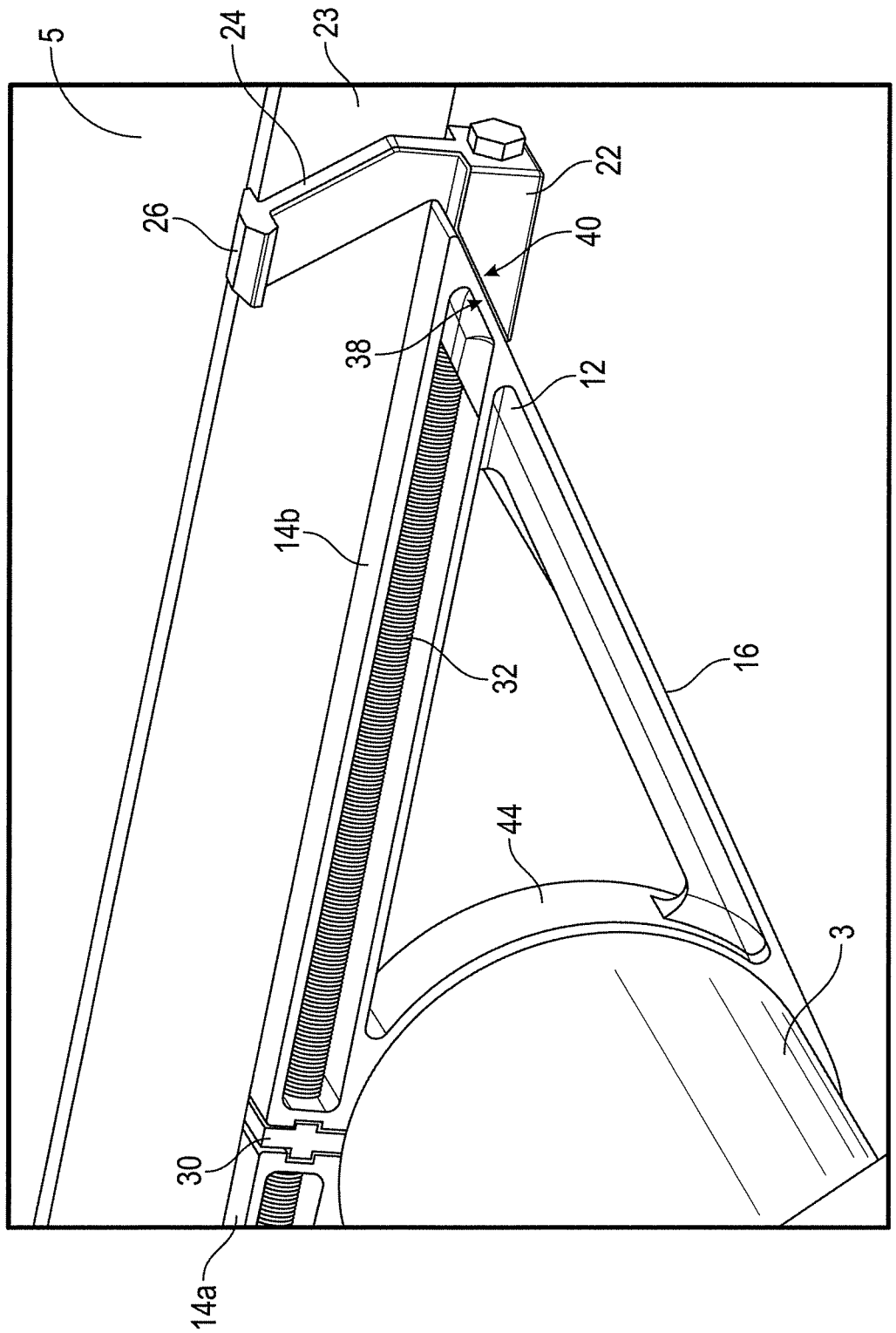
FIG. 6 is a detail perspective view of an exemplary embodiment of a mounting bracket assembly in accordance with the present disclosure.
Figure 7:
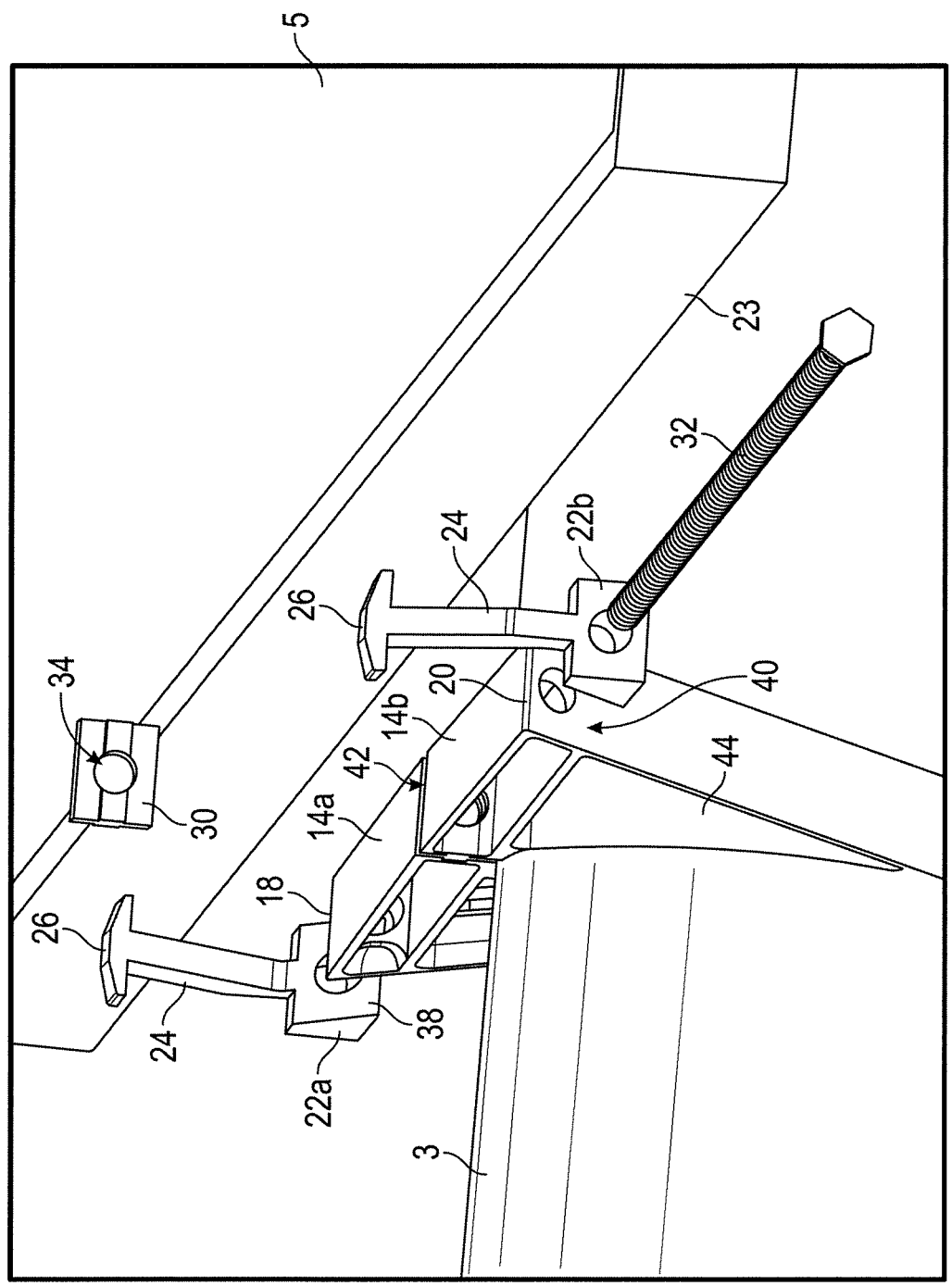
FIG. 7 is an exploded view of an exemplary embodiment of a mounting bracket assembly in accordance with the present disclosure.

As best seen in FIGS. 6 and 7, at least one clamp 22 is attached to an end 18, 20 of the top member 14 and in exemplary embodiments, a first clamp 22a is attached a first end 18 of the top member 14 and a second clamp 22b is attached to the second end 20 of the top member 14. An exemplary clamp 22 has an arm 24 and a flange 26. As discussed in detail herein, the arm 24 and flange 26 of the clamps 22a, 22b serve to attach to the top or side of a frame 23 of a PV module 5 to hold the module in place. Clamps 22 may also be compression style securing the PV module by compression or use hooks to attach to the sides of the PV module. The mounting bracket assembly 10 and clamps 22 may vary in length for different module designs and load requirements. Clamps 22 could also define an additional hole for driving a screw or other fastener through the clamp and a cutout in module frame to further secure a PV module.

Figure 8:
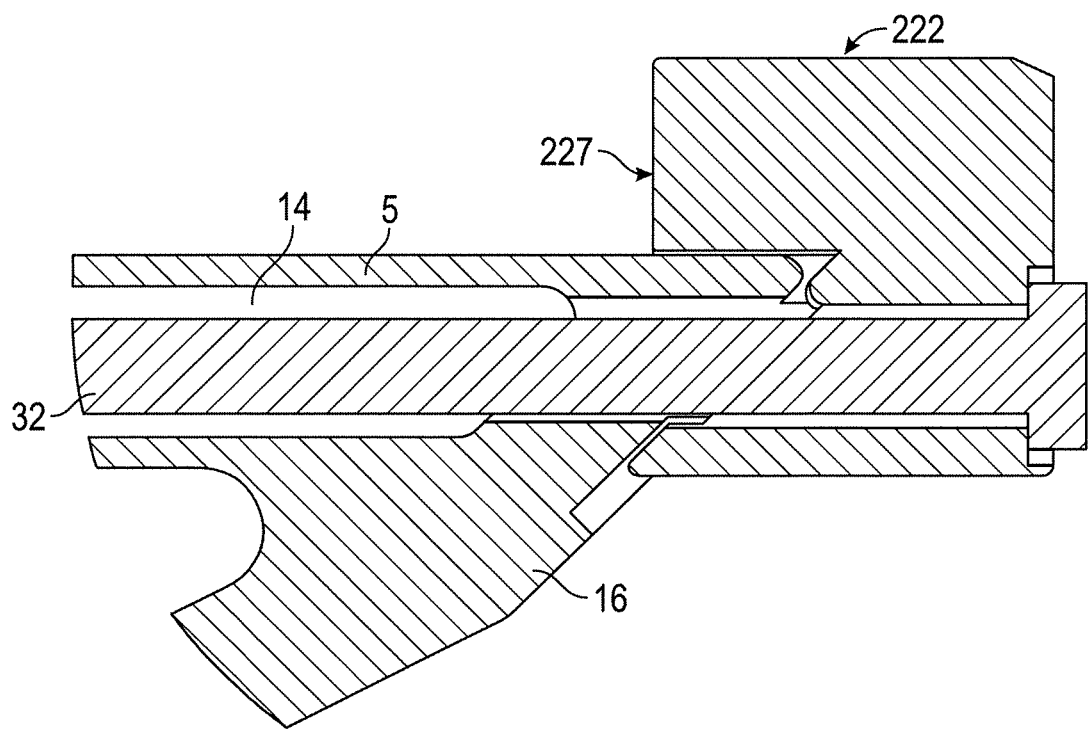
FIG. 8 is a cross-sectional view of an exemplary embodiment of a clamp of a mounting bracket assembly in accordance with the present disclosure.
Figure 9A:
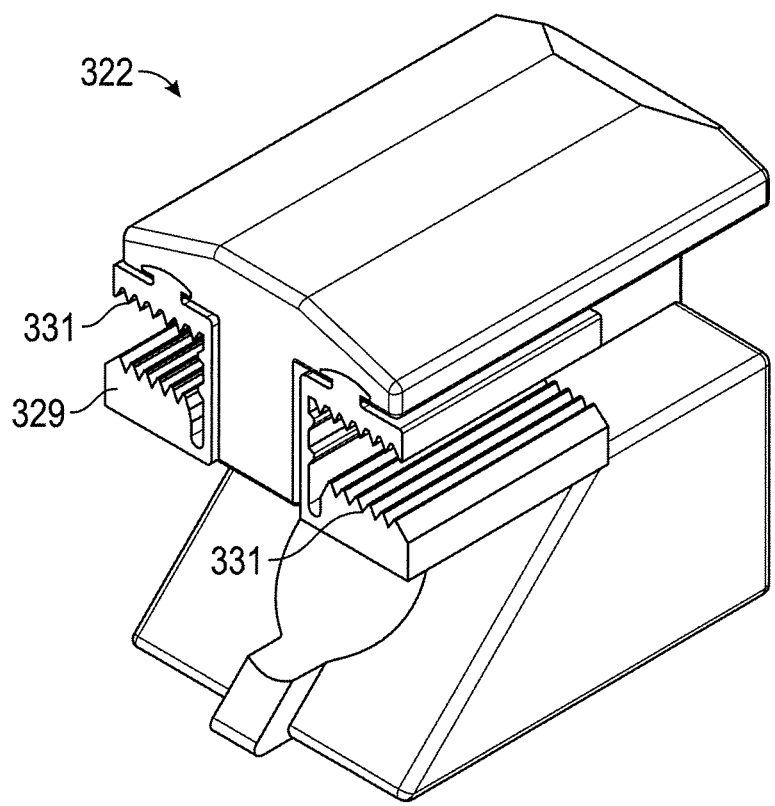
FIG. 9A is a front perspective view of an exemplary embodiment of a clamp of a mounting bracket assembly in accordance with the present disclosure.
Figure 9B:
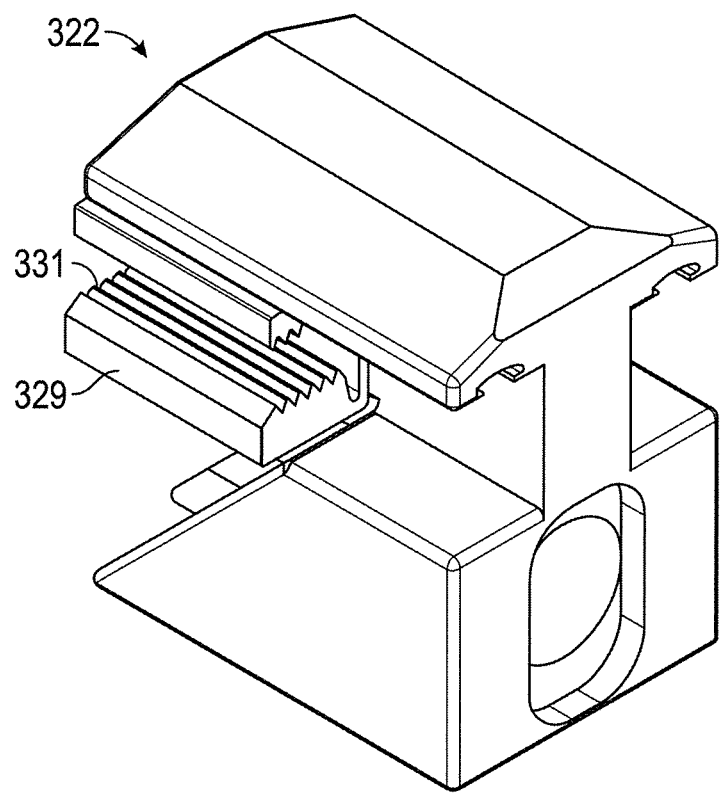
FIG. 9B is a rear perspective view of the clamp of FIG. 9A.
Figure 9C:
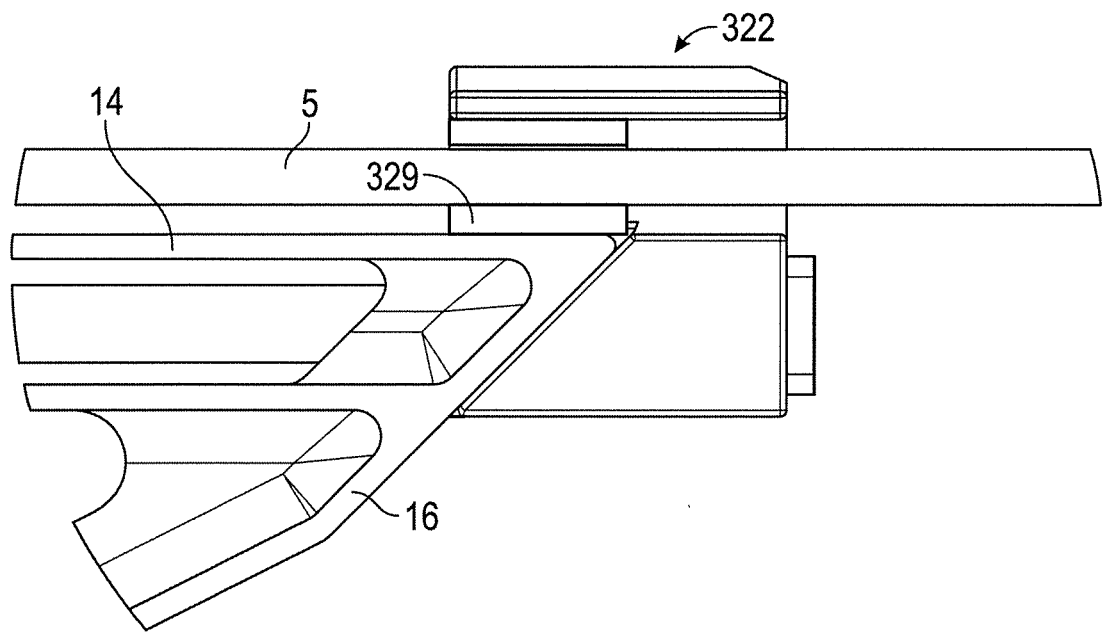
FIG. 9C is a side view of the clamp of FIG. 9A

For frameless PV modules, clamps 222 could include a substantially flat hard stop 227 for clamping the frameless PV modules. As seen in FIG. 8, an exemplary clamp 222 for frameless modules could feature a substantially flat hard stop 227 for securing a frameless PV module in a press fit. This advantageously provides the ability to tighten more on the torsion tube 3, not the module 5. Alternatively, as shown in FIGS. 9A-9C, clamp 322 could include a flexible insert component 329 having serrated teeth 331 for gripping and securing the glass or other substrate of a frameless PV module.

In exemplary embodiments, the mounting bracket assembly 10 includes an integral grounding device 30 capable of both securing and grounding an electricity generating device. An exemplary integral grounding device is grounding block 30, which could take several forms, such as a block with a cross-shaped or U-shaped cross section. An exemplary embodiment of a grounding block 30 is a component of stainless steel or other conductive material strong enough to pierce both the frame of a PV module and a torsion beam to create a grounded connection.

An exemplary arrangement of a grounding block 30 in a mounting bracket assembly 10 is illustrated in FIGS. 4B, 5B and 6-7. As shown, the top member 14 of the body 12 may comprise two top members 14a, 14b lined up to form the full top member 14 of the body 12 of the mounting bracket assembly 10. The grounding block 30, shown here as a conductive metal component, is disposed adjacent each top member 14a, 14b. More particularly, the grounding block is disposed in the center of the full top member 14 between top members 14a and 14b. This configuration advantageously provides grounding block 30 at a location where it can create a grounded connection between a mounted electricity generating device such as a PV module and a structural component such as a torsion beam of a mounting assembly.

Figure 10:
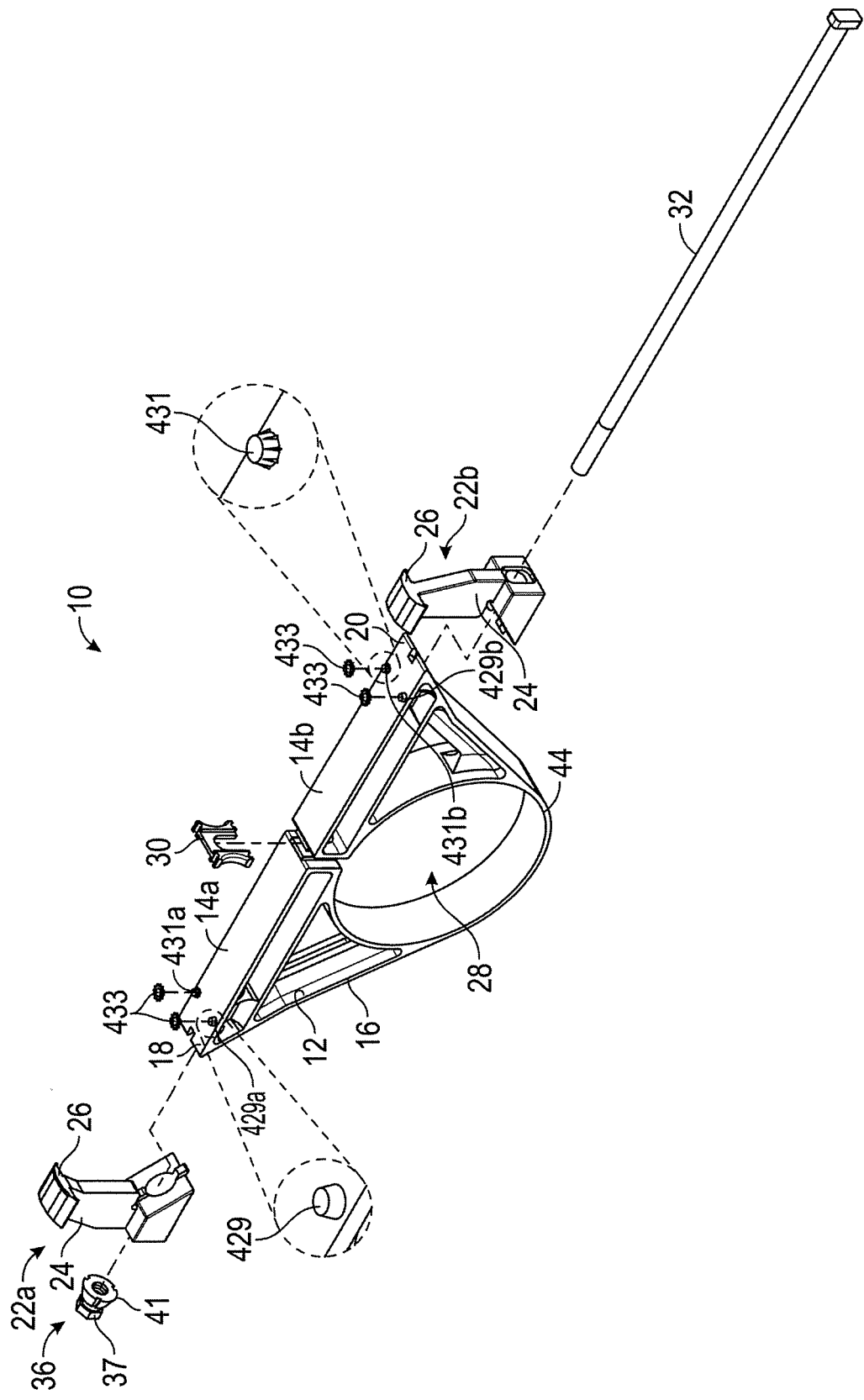
FIG. 10 is an exploded view of an exemplary embodiment of a mounting bracket assembly with a break-away nut in accordance with the present disclosure.

Turning to FIG. 10, exemplary embodiments of an integral grounding device 430 are illustrated in more detail. Advantageously, embodiments of grounding devices provide several options for grounding PV modules depending on the needs of the user. For instance, the integral grounding device 430 could include a locating pin 429 to index a PV module. An exemplary embodiment of a mounting bracket assembly 10 includes at least one module locating pin 429 and a grounding block 30 disposed in the center of the top member 14 between top members 14a and 14b. Another exemplary embodiment uses at least one module locating pin 429 (e.g., first and second locating pins 429a and 429b) with a grounding washer 433 to secure the locating pin 429 to the top member 14 and provide a grounding connection to the PV module 5. In a third embodiment, at least one spined grounding barb 431 (e.g., first and second barbs 431a and 431b) is attached to the top member 14 of the flexible body 12. The spined grounding barb 431 serves to secure and ground the PV module 5 and obviates the need for a grounding washer or grounding block.

In each of the above-described embodiments, the grounding block 30, the grounding washer 433, or the grounding barbs 431a, 431b, respectively, serve to provide a secure grounding connection between the electricity generating devices such as PV modules 5 and the torsion beam 3 to which the mounting bracket assemblies 10 are attached. The locating pins 429a, 429b also enable attachment and locking of the PV modules 5 to the mounting assembly. In particular, the locating pins 429 are advantageous for locating and locking in the modules, and could be serrated to gouge into the modules. The locating pin could also be a hooked component that indexes off the seam.

Figure 17:
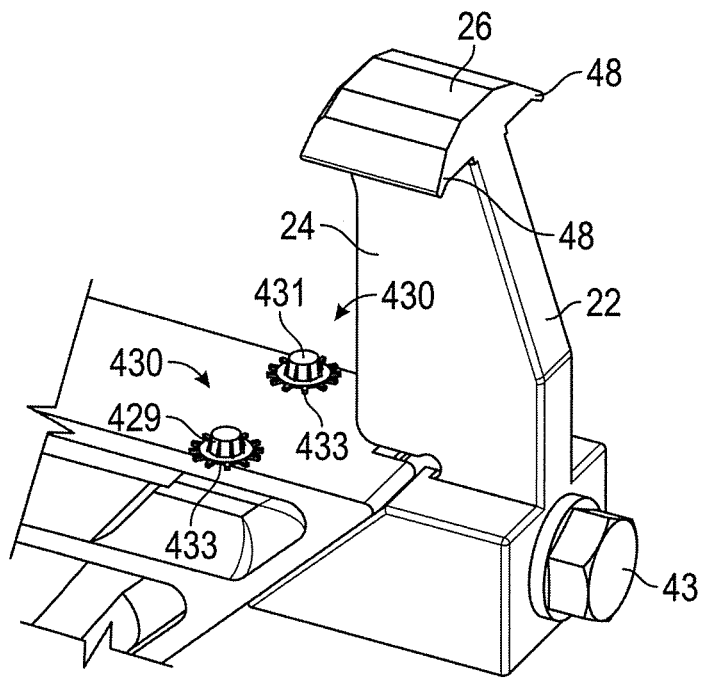
FIG. 17 is a detail view of an exemplary embodiment of a clamp of a mounting bracket assembly in accordance with the present disclosure.
Figure 18:
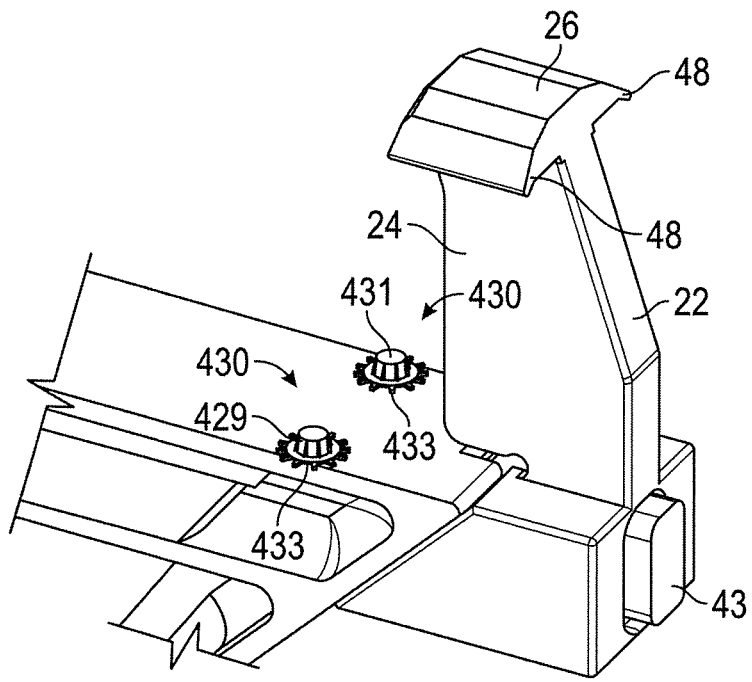
FIG. 18 is a detail view of an exemplary embodiment of a clamp of a mounting bracket assembly in accordance with the present disclosure.
Figure 19:
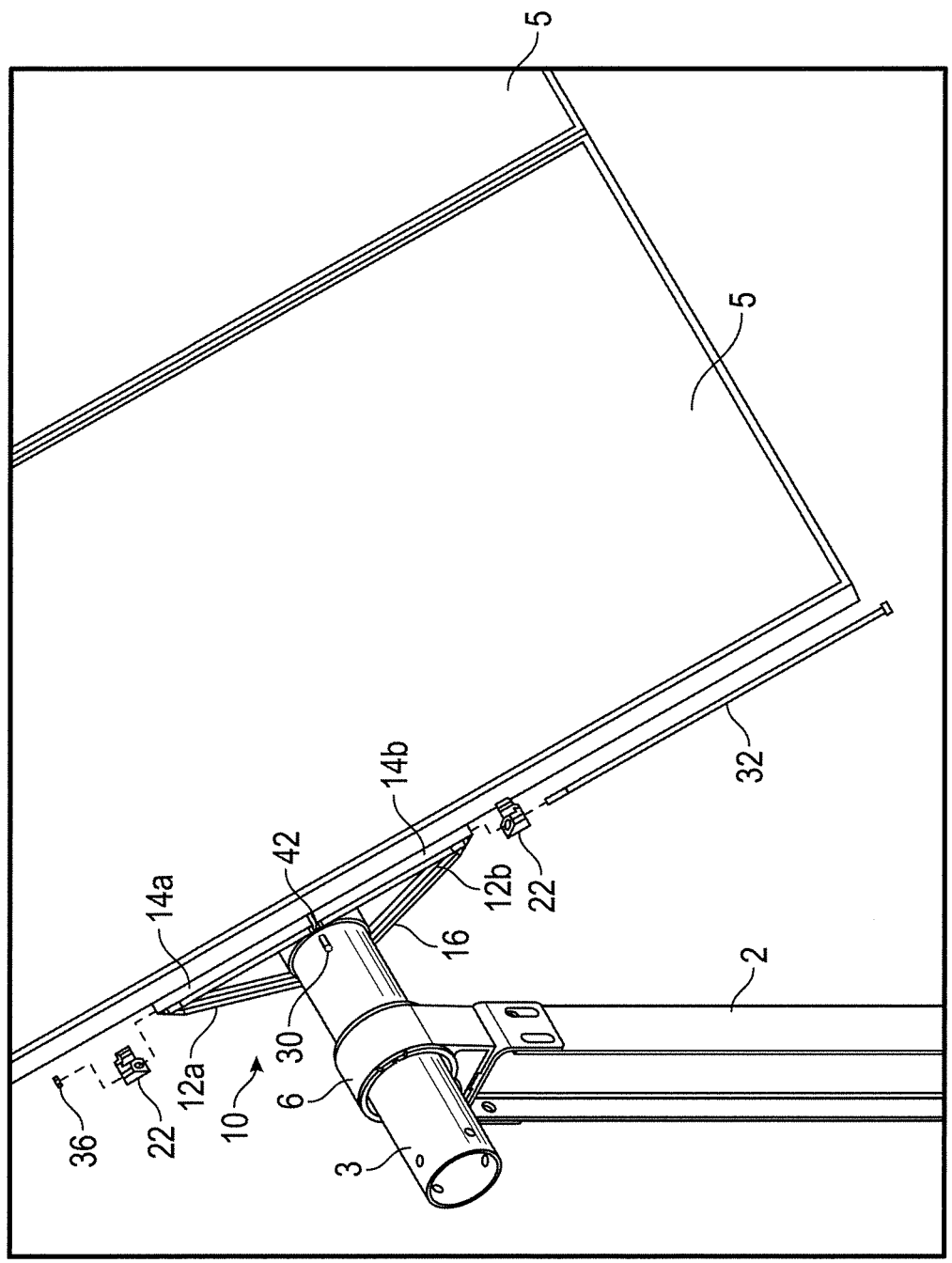
FIG. 19 is a perspective view of an exemplary embodiment of a mounting bracket and mounting assembly in accordance with the present disclosure.
Figure 20A:
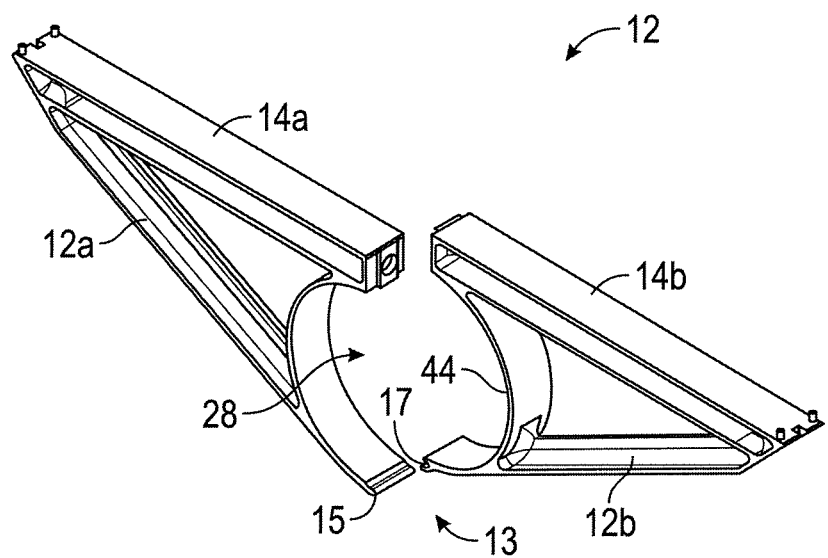
FIG. 20A is a perspective view an exemplary embodiment of a mounting bracket body in accordance with the present disclosure.
Figure 20B:
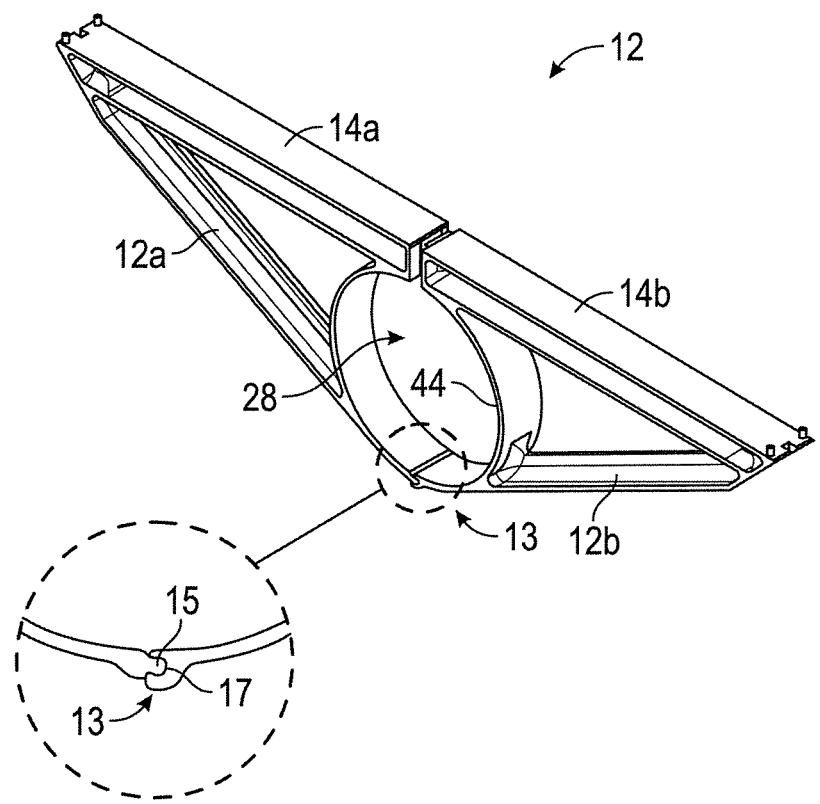
FIG. 20B is a perspective view an exemplary embodiment of a mounting bracket body in accordance with the present disclosure.

As best seen in FIGS. 4B-C, 5B-C and 6-7, the mounting bracket assembly 10 further comprises a threaded rod 32 running through the top member 14. More particularly, the rod 32 runs through first clamp 22a, first top member 14a, grounding block 30, second top member 14b, and second clamp 22b. As best seen in FIG. 7, an exemplary grounding block 30 may define a through hole 34 to facilitate the passage of rod 32. A clamping nut 36 is also provided. Together with the clamping nut 36, rod 32 serves to hold together the clamps, top members and grounding block. As shown in FIGS. 17 and 18, respectively, the bolt head 43 may be designed to enable turning or rotating the threaded rod 32 to adjust the mating angles of the clamps 22a, 22b on the first end 18 of the top member 14a, as described herein, or shaped so it cannot be rotated.

Clamping nut 36 advantageously facilitates attachment and grounding of electricity generating devices such as PV modules. More particularly, rotation of the clamping nut 36 inward on the rod 32 compresses the top members 14a, 14b and moves the grounding block 30 such it secures and grounds the electricity generating device through contact or piercing the electricity generating device and the torsion beam. In exemplary embodiments, as illustrated in FIGS. 11A, 11B, 11D and 12, the clamping nut 36 may include a break-away component 37 that breaks off the permanently attached component 39 at the proper level of torque.

Figure 11A:
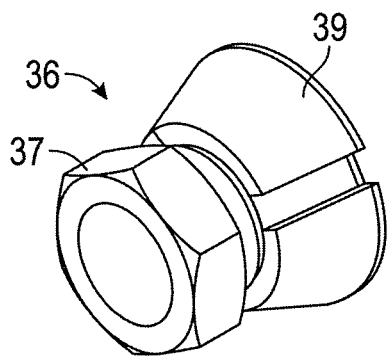
FIG. 11A is a perspective view of an exemplary embodiment of a clamping nut of a mounting bracket assembly in accordance with the present disclosure.
Figure 11B:
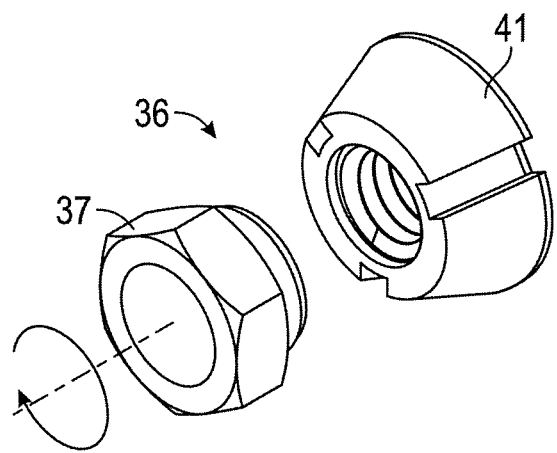
FIG. 11B is an exploded view of the clamping nut of FIG. 11A
Figure 11C:
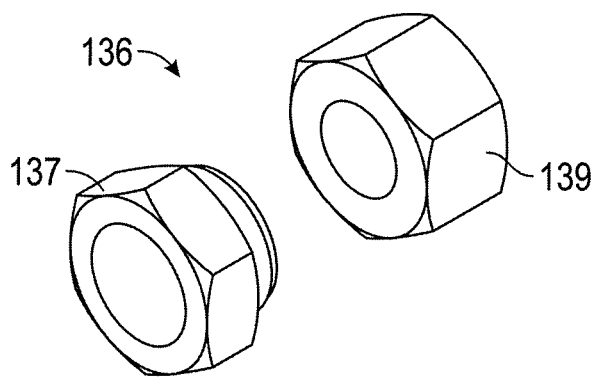
FIG. 11C is a perspective view of an exemplary embodiment of a clamping nut of a mounting bracket assembly in accordance with the present disclosure.
Figure 11D:
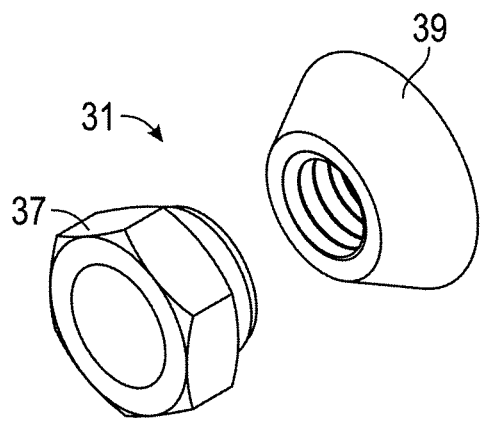
FIG. 11D is a perspective view of an exemplary embodiment of a clamping nut of a mounting bracket assembly in accordance with the present disclosure.
Figure 12:
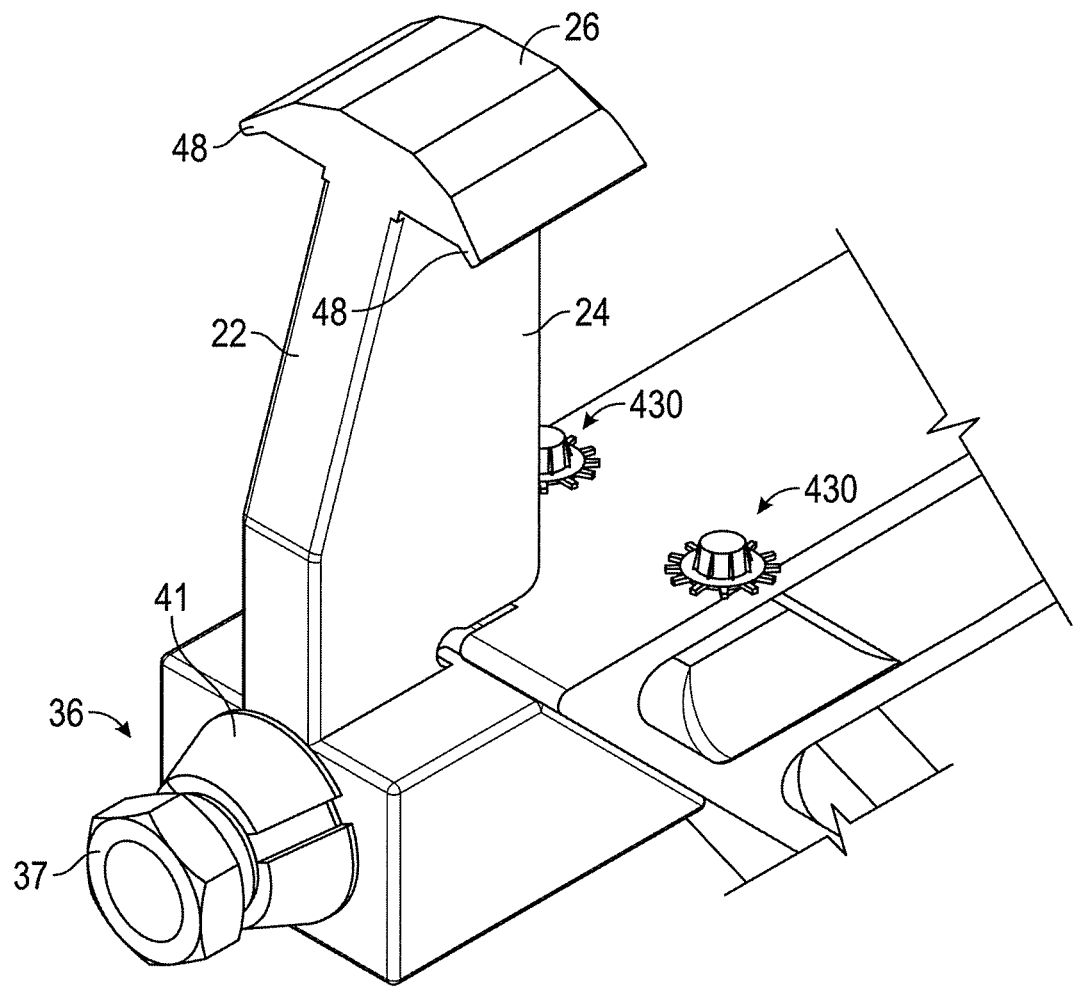
FIG. 12 is a detail view of an exemplary embodiment of a clamp of a mounting bracket assembly in accordance with the present disclosure.

More particularly, the break-away component 37 could be designed to break off when one or more of the following conditions are met: the PV module 5 is secured by the clamps 22, the module pressure has sufficient pressure on its ground points to achieve a good ground, and/or the mounting bracket assembly 10 has sufficient gripping force to be secured to the torsion beam 3 such that it will not rotate or slide on the beam under the load. The break-away feature could function as a torque quality assurance mechanism as well as having security hardware for an anti-theft system, which includes an anti-theft shaped nut 41 keyed to be removable. As shown in FIG. 11C, an alternative embodiment of a clamping nut 136 could have a removable component 137 that can be removed (without breaking) from the permanently attached component 139.

Referring to FIGS. 22, 23A and 23B, another exemplary embodiment employs a cam-over device 52 at the end of threaded rod 32 to provide a quick-release mechanism. The cam-over device 52 has a disengaged position in which the handle portion 54 is extended straight and an engaged position in which the handle portion 54 is folded downward perpendicular to the threaded rod 32. In the disengaged position the cam-over device 52 can be rotated to secure it to the end of the threaded rod 32 and to the clamp 22 of the mounting bracket assembly 10. Then the handle portion 54 of the cam-over device 52 may be folded downward to engage the quick-release mechanism. Once engaged, switching the handle portion 54 of the cam-over device 52 into the straight disengaged position quickly releases the device from the threaded rod 32.

Exemplary embodiments advantageously provide mechanisms for adjusting the clamping force on the electricity generating device and the mounting system by adjusting the angles certain components of the mounting bracket assembly. As best seen in FIGS. 6 and 7, clamp 22 may have an angled mating surface 38, and the first end 18 and second end 20 of the top member 14 may each have a corresponding angled surface 40. Thus, clamp 22a mates with the first end 18 of the top member 14 such that the angled mating surface 38 is adjacent the corresponding angled surface 40 of the first end 18 of the top member 14. Similarly, clamp 22b mates with the second end 20 of the top member 14 such that the angled mating surface 38 is adjacent the corresponding angled surface 40 of the second end 20 of the top member 14.

Figure 13A:
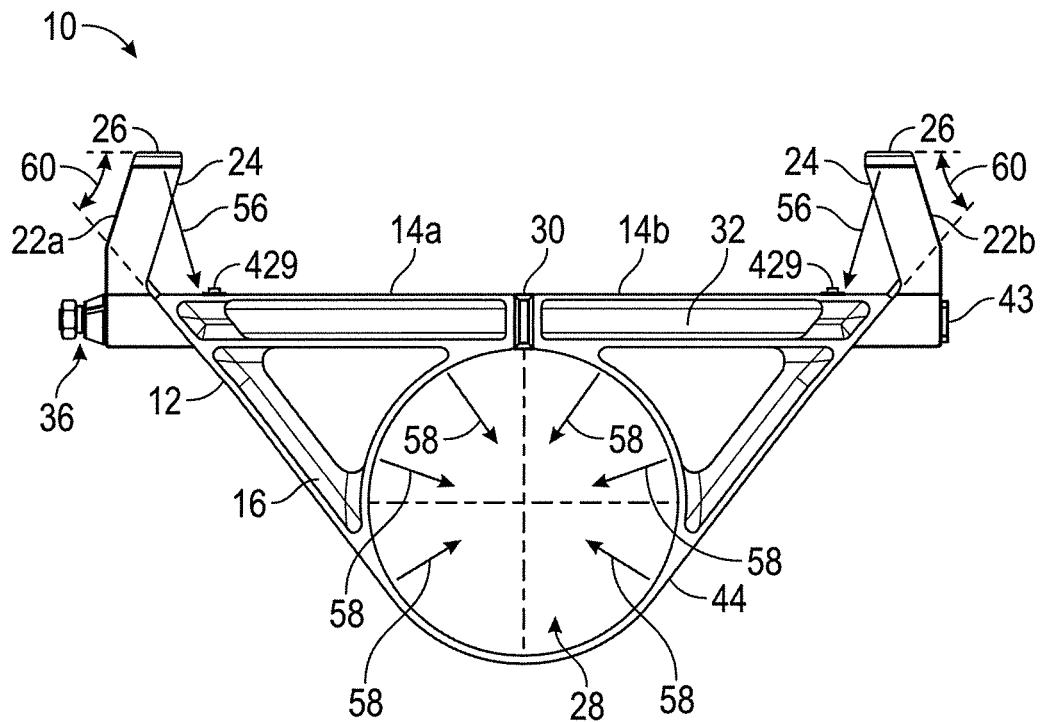
FIG. 13A is a front view of an exemplary embodiment of a mounting bracket assembly in accordance with the present disclosure.
Figure 13B:
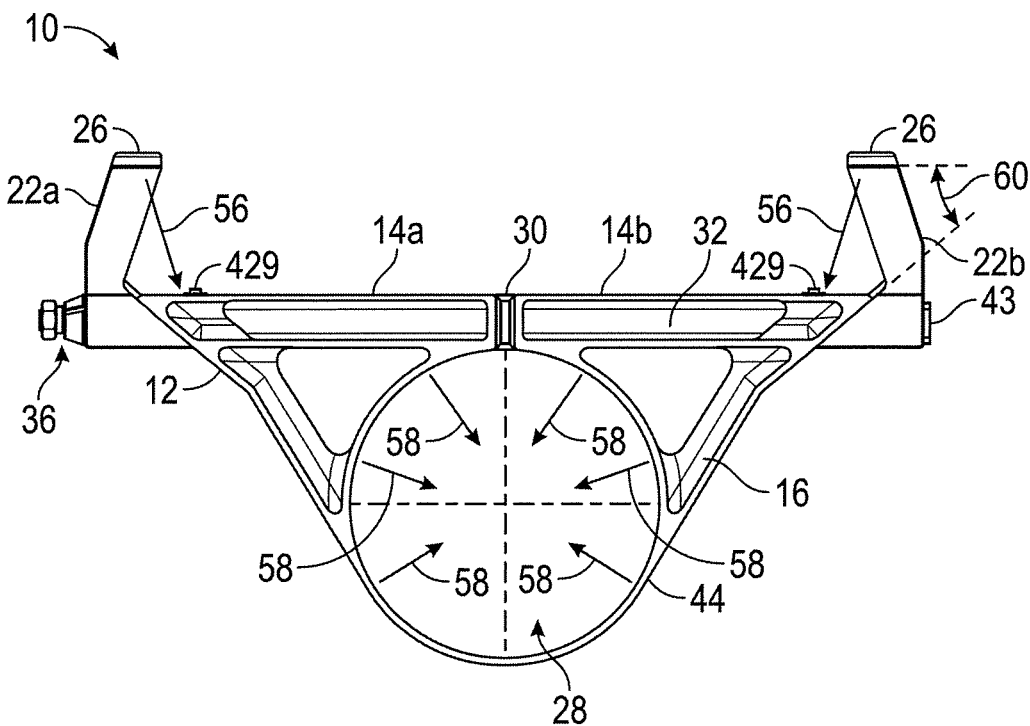
FIG. 13B is a front view of an exemplary embodiment of a mounting bracket assembly in accordance with the present disclosure.

As shown in FIGS. 13A-13B, varying the defined mating angle 60 of either clamp 22a and the first end 18 of the top member 14 or the defined mating angle 60 of clamp 22b and the second end 20 of the top member 14 changes the gripping force of the mounting bracket assembly 10 on the torsion beam 3 running through the beam insertion aperture 28. Also, varying the defined mating angle 60 of either clamp 22a and the first end 18 of the top member 14 or the defined mating angle 60 of clamp 22b and the second end 20 of the top member 14 changes the clamping force of the mounting bracket assembly 10 on the electricity generating device 5. Advantageously, this ability to change angles permits the adjustment of clamping force on the electricity generating device, e.g., PV module, and on the mounting system structure and torsion beam as separate forces using only one fastener.

Figure 14:
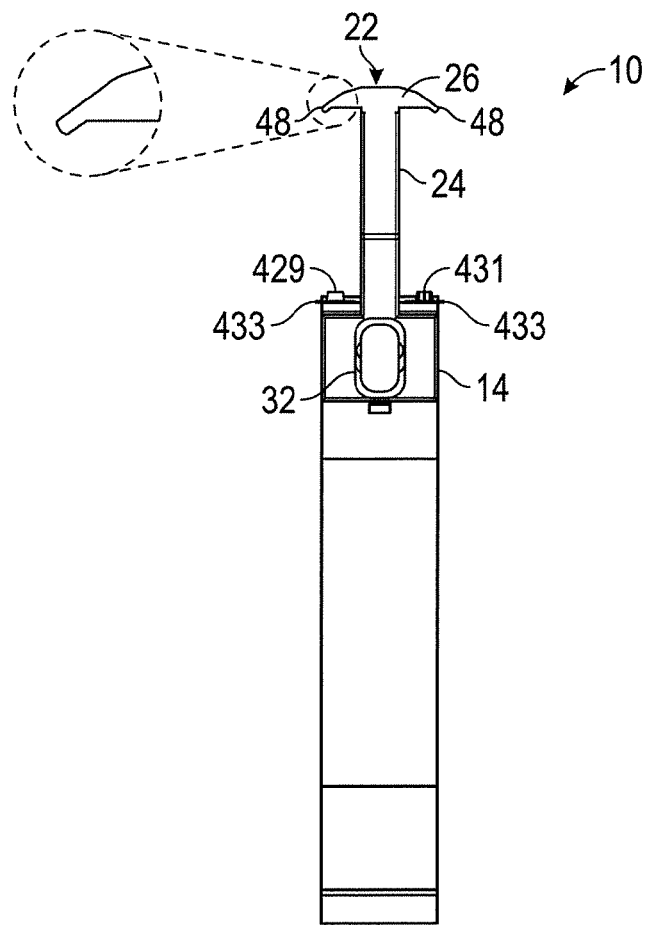
FIG. 14 is a side view of an exemplary embodiment of a mounting bracket assembly in accordance with the present disclosure.

Advantageously, exemplary embodiments facilitate separation of the downward clamping force 56 exerted on the PV module 5 and the gripping force 58 exerted on the torsion beam 3. This is accomplished by allowing the arm 24 of each clamp 22a, 22b to tighten to a physical stop, which results in the rest of the force in the threaded rod 32 to be directed into the gripping force 58 on the torsion beam. With the addition of the physical stop, the clamp flanges 26 may also incorporate a spring design feature 48, as shown in FIG. 14, which allows the downward clamping force 56 exerted on the PV module 5 to remain constant even if there is thickness variance of the module frame or during temperature fluctuations.

Figure 16:
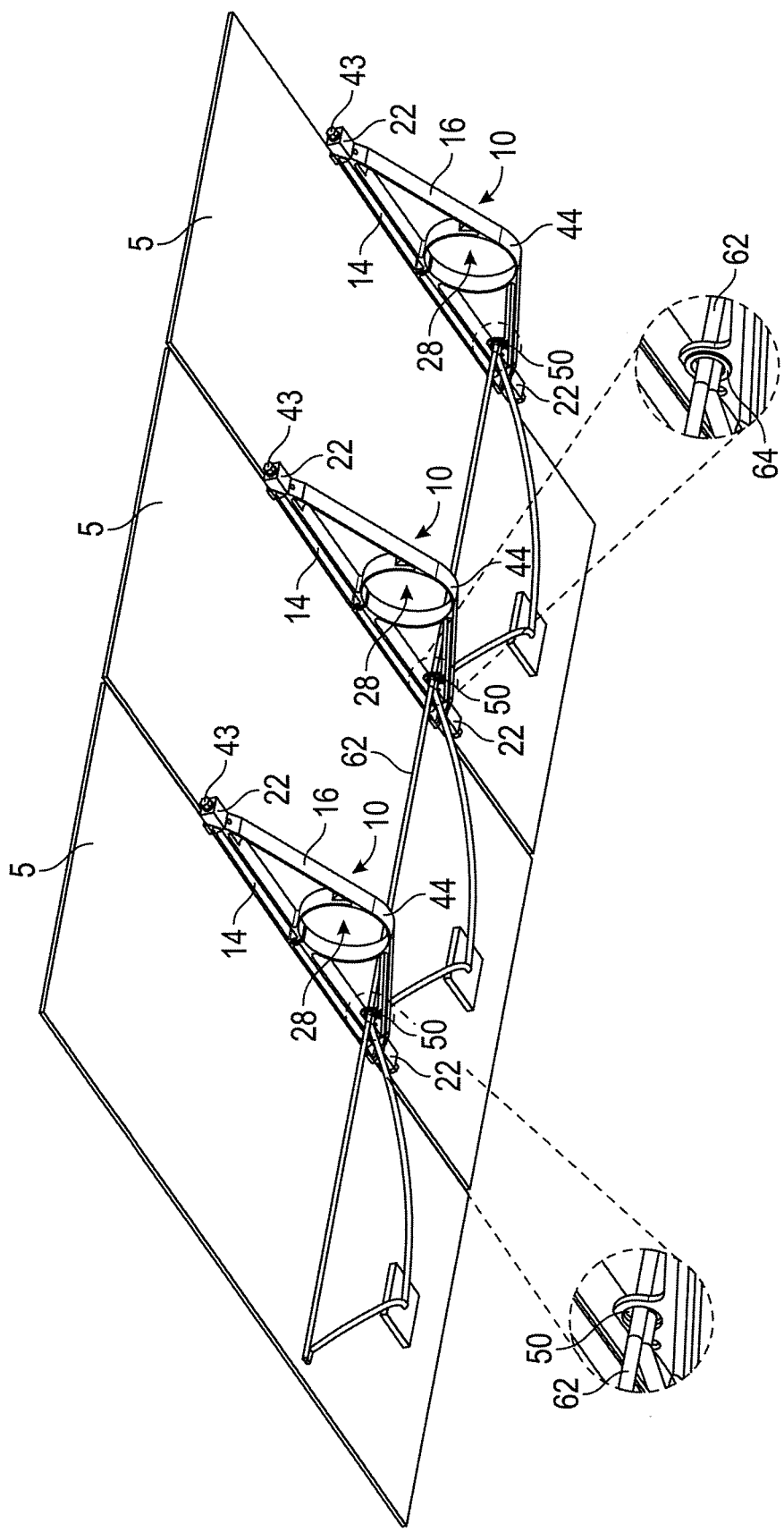
FIG. 16 is a rear perspective view of an exemplary embodiment of a mounting system and mounting bracket assembly in accordance with the present disclosure.

With reference to FIG. 16, exemplary embodiments may include wire routing in the design, providing integral wire management capability through the clamps 22. More particularly, the flexible body 12 of the mounting bracket assembly 10 could be designed to include an additional wire aperture 50 at a suitable spot on the body. An exemplary embodiment has the wire aperture 50 in a corner of the flexible body 12. In this way, wires 62 for transmission of electrical energy to a utility grid or off-grid load and/or to an inverter for current conversion can be conveniently run throughout the solar energy system and managed to some extent by movement of clamps 22. Optionally, a grommet 64 cold be provided to reduce tearing or abrasion on the wires.

In operation, a mounting bracket assembly 10 is connected to a torsion beam 3 of a solar mounting system 1 such that the torsion beam 3 runs through the beam insertion aperture 28 defined in the body 12 of the assembly. This connection could be achieved by sliding the torsion beam 3 through the beam insertion aperture 28 or by opening the body 12 of the mounting bracket assembly such that a gap 42 is formed in the ring 44 of the beam insertion aperture 28 and pressing torsion beam 3 through gap 42 into the aperture 28. In exemplary embodiments, the grounding block 30 is then inserted between first and second top members 14a, 14b.

One or more clamps 22 are attached to one or both ends 18, 20 of the full top member 14, particularly, a first clamp 22a is attached a first end 18 of the top member 14 and a second clamp 22b is attached to the second end 20 of the top member 14. Then a threaded rod 32 is inserted through first clamp 22a, first top member 14a, grounding block 30, second top member 14b, and second clamp 22b and secured with a clamping nut 36. One or more PV modules 5 are mounted to a mounting rack 4 and the arm 24 and flange 26 of the clamps 22a, 22b are attached to the top or side of the PV modules to hold them in place.

With the PV mounting system 1 assembled using the mounting bracket assembly 10, the system can be further secured and the PV modules 5 grounded by tightening the clamping nut 36 on the threaded rod 32 running through the top member 14. More particularly, the clamping nut 36 is rotated inward on the rod 32, which tightens the mounting bracket assembly 10. The rotation of clamping nut 36 presses first clamp 22a into first top member 14a and compresses the second top member 14b and second clamp 22b. This compression moves the grounding block 30 such it secures and grounds the electricity generating device through contact or piercing the electricity generating device and the torsion beam. Advantageously, the user can take just one step—the rotation of the clamping nut 36—to compress the entire mounting bracket assembly 10, simultaneously grounding and attaching the PV module 5. The clamping nut 36 may break off when the grounding block 30 secures and grounds the electricity generating device and/or when the desired torque is achieved. Once assembled and tightened as described, the geometry and/or friction of the mounting bracket assembly 10 keep it from rotating.

Referring to FIGS. 13A-13B, the user can adjust the clamping force 56 on the one or more PV modules and/or the gripping force 58 on the mounting system as needed by changing the angles of certain components of the mounting bracket assembly. More particularly, the user may change the mating angle 60 of clamp 22a on the first end 18 of the top member 14a and/or the mating angle 60 of clamp 22b on the second end 20 of the top member 14b. The user can change these angles by loosening or tightening the clamp bolt 46 on clamp 22b or loosening or tightening the clamping nut 36 on clamp 22a. By these adjustments, the user can change the gripping force 58 of the mounting bracket assembly 10 on the torsion beam 3 running through the beam insertion aperture 28 and/or the clamping force 56 of the mounting bracket assembly 10 on the one or more photovoltaic modules 5. Advantageously, this ability to change angles permits the adjustment of clamping force on the electricity generating device, e.g., PV module, and on the mounting system structure and torsion beam as separate forces using only one fastener. The PV module frames may have self-centering and locking features.

Thus, it is seen that improved mounting bracket assemblies and related methods are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A mounting bracket assembly comprising:
    a flexible body including at least one top member and a flexible angled bottom member connected to the top member, the flexible body defining a beam insertion aperture between the top member and the bottom member; and
    at least one clamp attached to the top member, the clamp having an angled mating surface corresponding to an angled end of the top member such that the clamp mates with the top member at a defined mating angle, the clamp further including an angled arm extending above the angled mating surface and a flange at a distal end of the arm.

2. The mounting bracket assembly of claim 1 further comprising:
    a threaded rod running through the at least one top member and the at least one clamp and securing the clamp to the top member; and
    a clamping nut securing the threaded rod to the top member.

3. The mounting bracket assembly of claim 2 further comprising an integral grounding device disposed adjacent the top member, the integral grounding device being configured to electrically ground an electricity generating device.

4. The mounting bracket assembly of claim 3 wherein the integral grounding device is a grounding block disposed in a middle portion of the top member such that rotating the clamping nut compresses the top member, thereby moving the grounding block such that it grounds the electricity generating device.

5. The mounting bracket assembly of claim 3 wherein the integral grounding device includes a locating pin located at or near an end portion of the top member.

6. The mounting bracket assembly of claim 3 wherein the electricity generating device is a photovoltaic module.

7. The mounting bracket assembly of claim 3 wherein the clamping nut is a break-away component that breaks off when the electricity generating device is secured by the at least one clamp at a pre-determined level of torque.

8. The mounting bracket assembly of claim 1 wherein varying the defined mating angle of the at least one clamp in relation to the top member changes a gripping force of the mounting bracket assembly on a beam running through the beam insertion aperture.

9. The mounting bracket assembly of claim 8 wherein varying the defined mating angle of the at least one clamp in relation to the top member changes a clamping force of the mounting bracket assembly on an electricity generating device.

10. The mounting bracket assembly of claim 1 wherein varying the defined mating angle of the at least one clamp in relation to the top member changes a clamping force of the mounting bracket assembly on an electricity generating device.

11. The mounting bracket assembly of claim 10 wherein varying the defined mating angle of the at least one clamp in relation to the top member changes a gripping force of the mounting bracket assembly on a beam running through the beam insertion aperture.

12. A mounting bracket assembly comprising:
    a flexible body including at least one top member, a flexible angled bottom member connected to the top member, the flexible body defining a beam insertion aperture between the top member and the bottom member;
    at least one clamp attached to the top member;
    a threaded rod running through the at least one top member and the at least one clamp and securing the clamp to the top member; and
    a clamping nut securing the threaded rod to the top member;
    wherein rotating the clamping nut secures the mounting bracket assembly to a torsion beam.

13. The mounting bracket assembly of claim 12 wherein the at least one clamp has an angled mating surface corresponding to an angled end of the top member such that the clamp mates with the top member at a defined mating angle.

14. The mounting bracket assembly of claim 13 wherein varying the defined mating angle of the at least one clamp in relation to the top member changes a gripping force of the mounting bracket assembly on a beam running through the beam insertion aperture.

15. The mounting bracket assembly of claim 13 wherein varying the defined mating angle of the at least one clamp in relation to the top member changes a clamping force of the mounting bracket assembly on an electricity generating device.

16. A mounting assembly comprising:
    at least one support column;
    a torsion beam connected to the support column;
    a mounting rack attached to the torsion beam;
    a mounting bracket assembly mounting the mounting rack to the torsion beam, the mounting bracket assembly including:
        a flexible body including at least one top member, a flexible angled bottom member connected to the top member, and defining a beam insertion aperture between the top member and the bottom member, the torsion beam running through the beam insertion aperture;
        at least one clamp attached to the top member;
        a threaded rod running through the at least one top member and the at least one clamp and securing the clamp to the top member; and
        a clamping nut securing the threaded rod to the top member;
    wherein rotating the clamping nut secures the mounting bracket assembly to the torsion beam.

17. The mounting assembly of claim 16 wherein the torsion beam has an at least partially rounded surface.

18. The mounting assembly of claim 16 wherein the mounting bracket assembly further comprises an integral grounding device disposed adjacent the top member, the integral grounding device being configured to electrically ground a photovoltaic module.

* * * * *